(12) United States Patent  
Mizusako et al.

(10) Patent No.: US 10,121,400 B2
(45) Date of Patent: Nov. 6, 2018

(54) VIDEO PROCESSING CIRCUIT, ELECTRO-OPTICAL DEVICE, ELECTRONIC APPARATUS, AND VIDEO PROCESSING METHOD

(71) Applicant: SEIKO EPSON CORPORATION, Tokyo (JP)

(72) Inventors: Kazuhisa Mizusako, Shiojiri (JP); Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/488,038

(22) Filed: Apr. 14, 2017

(65) Prior Publication Data

US 2017/0316727 A1    Nov. 2, 2017

(30) Foreign Application Priority Data

Apr. 28, 2016 (JP) ................................ 2016-090648

(51) Int. Cl.
  *G09G 3/00* (2006.01)
  *G02F 1/1337* (2006.01)
  (Continued)

(52) U.S. Cl.
  CPC ........... *G09G 3/006* (2013.01); *G02F 1/1368* (2013.01); *G02F 1/133707* (2013.01); *G02F 1/136286* (2013.01); *G09G 3/3677* (2013.01); *G09G 3/3688* (2013.01); *G02F 2001/13373* (2013.01); *G02F 2201/121* (2013.01);
  (Continued)

(58) Field of Classification Search
  CPC .... G09G 3/006; G09G 3/3677; G09G 3/3688; G09G 2330/08; G09G 2330/10; G09G 2310/0289; G02F 1/133707; G02F 1/136286; G02F 1/1368; G02F 2001/13373; G02F 2201/121; G02F 2201/123
  See application file for complete search history.

(56) References Cited

U.S. PATENT DOCUMENTS

2009/0243983 A1   10/2009  Ohashi et al.
2011/0051007 A1*   3/2011  Hosaka ................ G09G 3/2003
                                            348/673
(Continued)

FOREIGN PATENT DOCUMENTS

JP      2009-237366 A    10/2009
JP      2014-137383 A     7/2014
JP      2014-145931 A     8/2014

*Primary Examiner* — Erin M File
(74) *Attorney, Agent, or Firm* — Oliff PLC

(57) ABSTRACT

A video processing circuit includes a detecting unit that detects a set of a first pixel and a second pixel adjacent to the first pixel, which is a set of pixels in which a difference between application voltages to the first pixel and the second pixel which are indicated by an input video signal is greater than or equal to a threshold; an acquisition unit that acquires information which specifies a plurality of regions of voltage-brightness characteristics which are voltage-brightness characteristics of the pixel group and in which a voltage region is separated into the plurality of regions in accordance with a slope of the voltage-brightness characteristics; and a replacing unit that replaces the application voltage to the first pixel with a voltage which is in a region other than a first region and is close to a second region.

10 Claims, 18 Drawing Sheets

(51) Int. Cl.
*G02F 1/1362* (2006.01)
*G02F 1/1368* (2006.01)
*G09G 3/36* (2006.01)

(52) U.S. Cl.
CPC ............... *G02F 2201/123* (2013.01); *G09G 2310/0289* (2013.01); *G09G 2330/08* (2013.01); *G09G 2330/10* (2013.01)

(56) References Cited

U.S. PATENT DOCUMENTS

| | | | |
|---|---|---|---|
| 2011/0109815 A1* | 5/2011 | Hosaka | G09G 3/3648 348/792 |
| 2012/0147272 A1* | 6/2012 | Hosaka | G09G 3/3648 348/607 |
| 2013/0241967 A1 | 9/2013 | Nishimura et al. | |
| 2013/0241968 A1 | 9/2013 | Wakabayashi et al. | |
| 2013/0335650 A1 | 12/2013 | Wakabayashi et al. | |
| 2014/0146097 A1* | 5/2014 | Kimura | G09G 3/3648 345/690 |
| 2017/0054879 A1* | 2/2017 | Hosaka | G09G 3/3648 |

* cited by examiner

FIG. 13

| | | BRIGHT PIXEL | | |
|---|---|---|---|---|
| | | REGION I | REGION II | REGION III |
| DARK PIXEL | REGION I | DARK PIXEL: NO REPLACEMENT BRIGHT PIXEL: NO REPLACEMENT α1 β1 | DARK PIXEL: CVL BRIGHT PIXEL: NO REPLACEMENT α2 β2 | DARK PIXEL: CVL BRIGHT PIXEL: CVH α2 β2 |
| | REGION II | | DARK PIXEL: NO REPLACEMENT BRIGHT PIXEL: NO REPLACEMENT α2 β2 | DARK PIXEL: NO REPLACEMENT BRIGHT PIXEL: CVH α2 β2 |
| | REGION III | | | DARK PIXEL: NO REPLACEMENT BRIGHT PIXEL: NO REPLACEMENT α3 β3 |

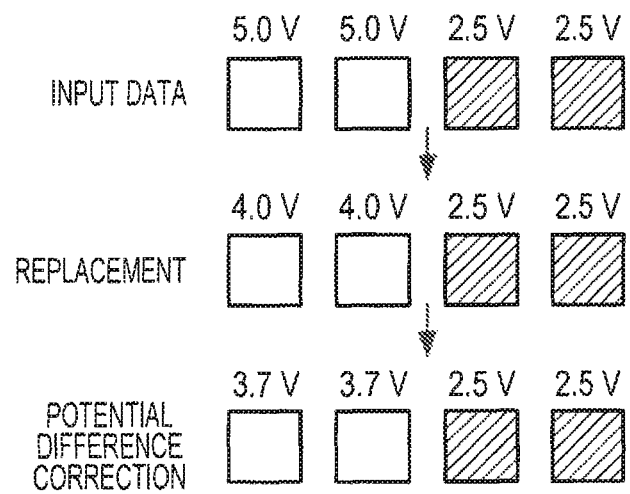

| | INPUT DATA | | | | AFTER PROCESSING | |
|---|---|---|---|---|---|---|
| 1.1 V | | 0.0 V | | 1.1 V | | 0.2 V |
| 1.3 V | | 0.0 V | | 1.3 V | | 0.6 V |
| 1.5 V | | 0.0 V | | 1.5 V | | 1.0 V |
| 1.7 V | | 0.0 V | → | 1.7 V | | 1.4 V |
| 1.9 V | | 0.0 V | | 1.9 V | | 1.8 V |
| 2.1 V | | 0.0 V | | 2.1 V | | 2.0 V |
| 2.3 V | | 0.0 V | | 2.3 V | | 2.0 V |
| 2.5 V | | 0.0 V | | 2.5 V | | 2.0 V |
| 2.7 V | | 0.0 V | | 2.7 V | | 2.0 V |
| 2.9 V | | 0.0 V | | 2.9 V | | 2.0 V |
| 3.1 V | | 0.0 V | | 3.1 V | | 2.0 V |

VIDEO PROCESSING CIRCUIT, ELECTRO-OPTICAL DEVICE, ELECTRONIC APPARATUS, AND VIDEO PROCESSING METHOD

BACKGROUND

1. Technical Field

The present invention relates to a video processing circuit, an electro-optical device, an electronic apparatus, and a video processing method, and particularly, to a technology of reducing defects on a display of the electro-optical device.

2. Related Art

A liquid crystal panel originally controls an orientation state of liquid crystal molecules by using an electric field between a pixel electrode and a counter electrode of a pixel. However, for example, if the liquid crystal panel has a high resolution and a distance between adjacent pixels is reduced, there is a case where an electric field (horizontal electric field) is generated between pixel electrodes of two pixels, and misorientation (so-called disclination or reverse tilt domain) occurs in which liquid crystal molecules are oriented in an unintended direction. The occurrence of the misorientation causes a decrease of display quality of the liquid crystal panel. In contrast to this, JP-A-2009-237366 discloses a technology of preventing the misorientation from occurring.

In the technology of JP-A-2009-237366, there is a case where effects of correction are weakened by voltage-brightness characteristics (for example, V-T characteristics) of a liquid crystal element.

SUMMARY

An advantage of some aspects of the invention is to provide a technology of reducing a possibility that disturbance of a video due to misorientation is visually recognized.

A video processing circuit according to an aspect of the invention includes a detecting unit that detects a set of a first pixel and a second pixel adjacent to the first pixel, which is a set of pixels in which a difference between application voltages to the first pixel and the second pixel which are indicated by an input video signal is greater than or equal to a threshold, from a pixel group which is arranged in a first direction and a second direction; an acquisition unit that acquires information which specifies a plurality of regions of voltage-brightness characteristics which are voltage-brightness characteristics of the pixel group and in which a voltage region is separated into the plurality of regions in accordance with a slope of the voltage-brightness characteristics; and a replacing unit that replaces the application voltage to the first pixel with a voltage which is in a region other than a first region and is close to a second region, in a case where the application voltage to the first pixel which is indicated by the input video signal is contained in the first region of the plurality of regions and an application voltage to the second pixel is contained in the second region different from the first region.

According to the video processing circuit, it is possible to reduce a possibility that disturbance of a video due to misorientation is visually recognized.

The replacing unit may replace a pixel, which is contained in a region where a slope of the voltage-brightness characteristics is gentler, in the set of pixels that are detected by the detecting unit, with the first pixel.

According to the video processing circuit, it is possible to prevent gradation from changing due to replacement of a voltage.

The voltage region of the voltage-brightness characteristics may be separated into three or more regions, and in a case where a third region is interposed between the first region and the second region, the replacing unit may replace both the application voltage to the first pixel and the application voltage to the second pixel, with a voltage in the third region.

According to the video processing circuit, even in a case where a third region is interposed between the first region and the second region, possible to replace a voltage.

The replacing unit may determine the replaced application voltage to the first pixel in accordance with the application voltage to the second pixel.

According to the video processing circuit, it is possible to prevent gradation from changing due to replacement of a voltage.

The video processing circuit may include a correcting unit that corrects at least one of the application voltages to the first pixel and the second pixel which are replaced by the replacing unit, such that a difference between the application voltages to the first pixel and the second pixel is reduced.

According to the video processing circuit, it is possible to reduce misorientation.

The correction of the correcting unit may include processing of multiplying the application voltage to the first pixel by a correction coefficient, and the correction coefficient may be determined with respect to each of the plurality of regions.

According to the video processing circuit, it is possible to reduce a possibility that disturbance of a video due to misorientation is visually recognized.

The steeper the slope of the voltage-brightness characteristics in the plurality of regions is, the smaller a value of the correction coefficient may be.

According to the video processing circuit, it is possible to reduce a possibility that disturbance of a video due to misorientation is visually recognized, compared with a case where a common correction coefficient is used.

The correcting unit may correct the application voltage to the first pixel by using the correction coefficient whose value is determined in accordance with the application voltage to the second pixel.

According to the video processing circuit, it is possible to reduce a possibility that disturbance of a video due to misorientation is visually recognized, compared with a case where a common correction coefficient is used.

In addition, an electro-optical device according to another aspect of the invention includes a display unit that includes a pixel group which are disposed in a first direction and a second direction; a detecting unit that detects a set of a first pixel and a second pixel adjacent to the first pixel, which is a set of pixels in which a difference between application voltages to the first pixel and the second pixel which are indicated by an input video signal is greater than or equal to a threshold, from the pixel group; an acquisition unit that acquires information which specifies a plurality of regions of voltage-brightness characteristics which are voltage-brightness characteristics of the pixel group and in which a voltage region is separated into the plurality of regions in accordance with a slope of the voltage-brightness characteristics; and a replacing unit that replaces an application voltage to the first pixel with a voltage which is in a region other than a first region and is close to a second region, in a case where the application voltage to the first pixel which is indicated by the input video signal is contained in the first region of the plurality of regions and an application voltage to the second pixel is contained in the second region different from the first region.

According to the electro-optical device, it is possible to reduce a possibility that disturbance of a video due to misorientation is visually recognized.

Furthermore, an electronic apparatus according to still another aspect of the invention includes the electro-optical device.

According to the electronic apparatus, it is possible to reduce a possibility that disturbance of a video due to misorientation is visually recognized.

Furthermore, a video processing method according to still another aspect of the invention includes detecting a set of a first pixel and a second pixel adjacent to the first pixel, which is a set of pixels in which a difference between application voltages to the first pixel and the second pixel which are indicated by an input video signal is greater than or equal to a threshold, from a pixel group which is arranged in a first direction and a second direction; and replacing the application voltage to the first pixel with a voltage which is in a region other than a first region and is close to a second region, in a case where the application voltage to the first pixel which is indicated by the input video signal is contained in the first region of a plurality of regions of voltage-brightness characteristics in which a voltage region is separated into the plurality of regions in accordance with a slope, and an application voltage to the second pixel is contained in the second region different from the first region.

According to the video processing circuit, it is possible to reduce a possibility that disturbance of a video due to misorientation is visually recognized.

BRIEF DESCRIPTION OF THE DRAWINGS

The invention will be described with reference to the accompanying drawings, wherein like numbers reference like elements.

FIG. 13 is a diagram illustrating a replaced voltage and a correction coefficient.

FIG. 14 is a diagram illustrating an example of processing of the video processing circuit.

FIG. 23 is a diagram illustrating an example of processing of the video processing circuit according to the second embodiment.

DESCRIPTION OF EXEMPLARY EMBODIMENTS

Figure 1:
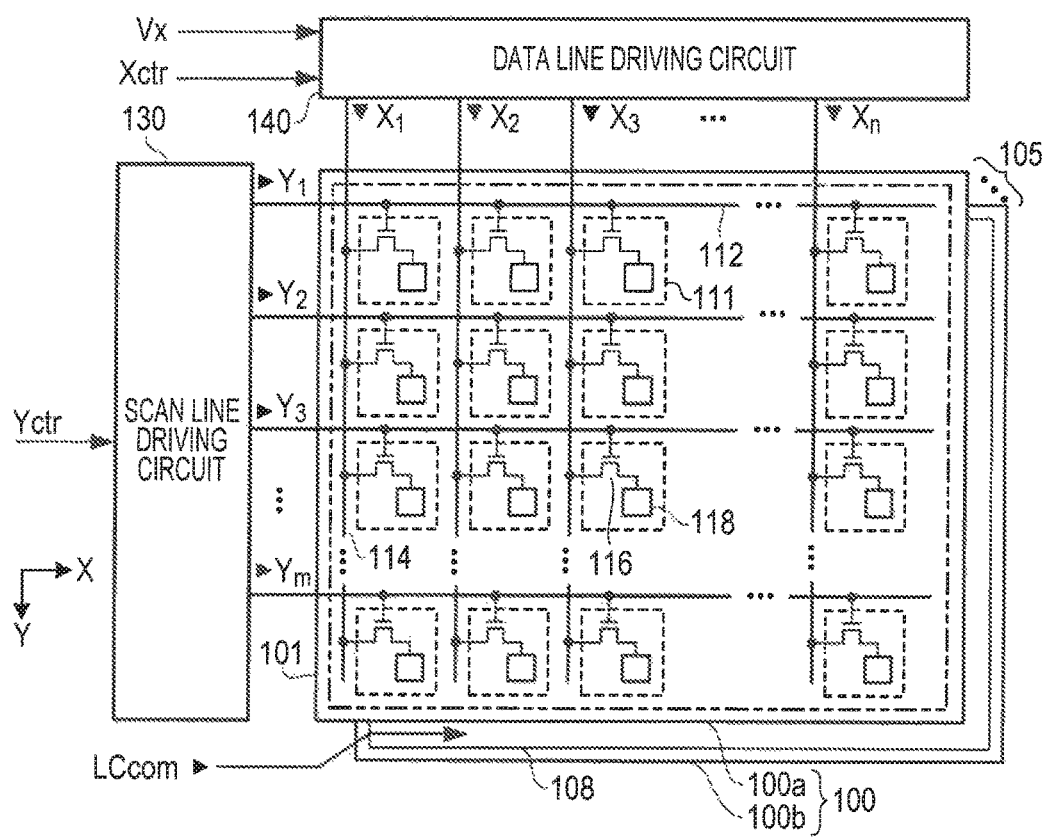
FIG. 1 is a diagram illustrating a schematic configuration of a liquid crystal display device.

1. Configuration of Liquid Crystal Display Device 1-1. Overview of Liquid Crystal Display Device FIG. 1 is a diagram illustrating a schematic diagram of a liquid crystal display device. A configuration and problems of the liquid crystal display device will be described prior to description of a configuration and an operation of a device according to an embodiment. The liquid crystal display device includes a liquid crystal panel 100, a scan line driving circuit 130, and a data line driving circuit 140.

The liquid crystal panel 100 is a device which displays an image in response to a signal that is supplied. The liquid crystal panel 100 includes pixels 111 which are arranged in a matrix of m rows and n columns. The pixels 111 display an optical state in response to a signal which is supplied from the scan line driving circuit 130 and the data line driving circuit 140. The liquid crystal panel 100 displays an image by controlling optical states of a plurality of pixels 111. The optical state indicates transmittivity in a transmissive liquid crystal display device and indicates reflectivity in a reflective liquid crystal display device.

The liquid crystal panel 100 includes an element substrate 100a, a counter substrate 100b, and a liquid crystal 105. The element substrate 100a and the counter substrate 100b are bonded together with a constant gap therebetween. The liquid crystal 105 is inserted into the gap.

The element substrate 100a includes scan lines 112 of m rows and data line 114 of n columns on a surface thereof facing the counter substrate 100b. The scan lines 112 are provided in the X (horizontal) direction, the data lines 114 are provided in the Y (vertical) direction, and the scan lines are insulated from the data lines. In order to distinguish between one scan line 112 and other scan lines 112, the scan lines are referred to as the scan line 112 of a first row, the scan line 112 of a second row, the scan line 112 of a third row, ..., the scan line 112 of an (m−1)$^{th}$ row, and the scan line of an m$^{th}$ row sequentially from the top in the figure. In the same manner, in order to distinguish between one data line 114 and other data lines 114, the data lines are referred to as the data line 114 of a first column, the data line 114 of a second column, the data line 114 of a third column, ..., the data line 114 of an (n−1)$^{th}$ column, and the data line 114 of an n$^{th}$ column sequentially from the left in the figure. When viewing from a point of view in a position perpendicular to an X axis and a Y axis, the pixel 111 is provided corresponding to an intersection between the scan lines 112 and the data line 114. That is, the liquid crystal panel 100 is an example of a display unit having a pixel group (pixels 111) disposed in a first direction (for example, X direction) and a second direction (for example, Y direction).

Figure 2:
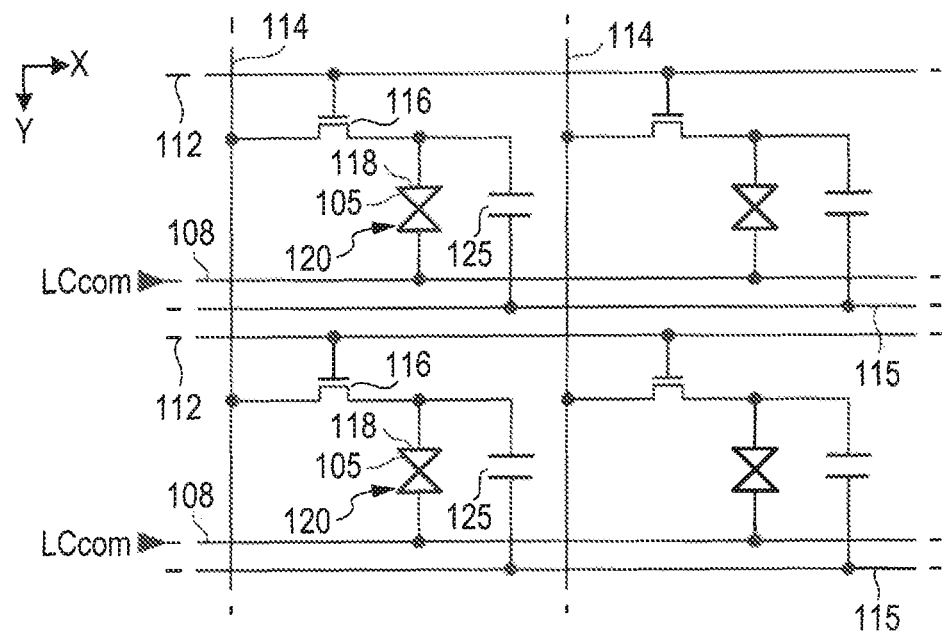
FIG. 2 is a diagram illustrating equivalent circuits of pixels.

FIG. 2 is a diagram illustrating equivalent circuits of the pixels ill. The pixel 111 includes a thin film transistor (TFT) 116, a liquid crystal element 120, and a retention capacitor 125. The liquid crystal element 120 includes a pixel electrode 118, the liquid crystal 105, and a common electrode 108. The pixel electrode 118 is individually provided in each pixel 111. The common electrode 108 is common to all the pixels 111. The pixel electrode 118 and the common electrode 108 are respectively provided on the element substrate 100a and the counter substrate 100b. The liquid crystal 105 is interposed between the pixel electrode 118 and the common electrode 108. A common voltage LCcom is applied to the common electrode 108.

The TFT 116 is an example of a switching element which controls application of a voltage to the pixel electrode 118, and is an n-channel field effect transistor in the example. The TFT 116 is individually provided in each pixel 111. A gate, a source, and a drain of the TFT 116 of the i$^{th}$ row and the j$^{th}$ column are respectively connected to the scan lines 112 of the i$^{th}$ row, the data lines 114 of the j$^{th}$ column, and the pixel electrode 118, One terminal and the terminal of the retention capacitor 125 are respectively connected to the pixel electrode 118 and a capacitance line 115. A voltage which is constant in time is applied to the capacitance line 115.

If a voltage (hereinafter, referred to as a "selection voltage") of a high level is applied to the scan lines 112 of the i$^{th}$ row, the TFT 116 of the i$^{th}$ row and the j$^{th}$ column is turned on (low impedance state), and the source is electrically connected to the drain. At this time, if a voltage (hereinafter, referred to as a "data voltage") according to a gradation value (data) of the pixel 111 of the i$^{th}$ row and the j$^{th}$ column is applied to the data lines 114 of the j$^{th}$ column, the data voltage is applied to the pixel electrode 118 of the i$^{th}$ row and the j$^{th}$ column rough the TFT 116.

Thereafter, if a voltage (Hereinafter, referred to as a "non-selection voltage") of a low level is applied to the scan lines 112 of the i$^{th}$ row, the TFT 116 is turned off (high impedance state), and impedance between the source and the drain enters a high impedance state. When the TFT 116 is in a turn-on state, a voltage which is applied to the pixel electrode 118 is also retained after the TFT 116 turned off by capacitance of the liquid crystal element 120 and the retention capacitor 125.

A voltage corresponding to a potential difference between the data voltage and the common voltage is applied to the liquid crystal element 120. A molecular orientation state of the liquid crystal 105 changes depending on the voltage which is applied to the liquid crystal element 120. An optical state of the pixel 111 changes depending on the molecular orientation state of the liquid crystal 105.

FIG. 1 is referred to again. The scan line driving circuit 130 select (that is, scans the scan lines 112) sequentially and exclusively one scan line 112 of m scan lines 112. Specifically, the scan line driving circuit 130 supplies a scan signal Yi to the scan line 112 of the i$^{th}$ row in response to a control signal Yctr. In the example, the scan signal Yi becomes a selection voltage for the scan line 112 which is selected, and becomes a non-selection voltage for the scan lines 112 which is not selected.

The data line driving circuit 140 outputs a signal (Hereinafter, referred to as a "data signal") indicating a data voltage to n data lines 114. Specifically, the data line driving circuit 140 samples a data signal Vx which is supplied from a video processing circuit 30 in response to a control signal Xctr, and outputs the sampled signal to the data line 114 of the first column to the data line 114 of the nth column as the data signals X1 to Xn. IN the present description, a voltage is denoted by using a ground potential as a reference (zero volts) which is not illustrated, except for a voltage which is applied to the liquid crystal element 120, as long as there is no description in particular.

An image which is displayed on the liquid crystal panel 100 is rewritten in a predetermined cycle. Hereinafter, a cycle of rewriting is called a "frame". For example, in a case where an image is rewritten in 60 Hz, one frame is approximately 16.7 msec. The scan line driving circuit 130 scans the m scan lines 112 once per frame, the data line driving circuit 140 outputs the data signal, and thereby, an image which is displayed on the liquid crystal panel 100 is rewritten.

1-2. Display Defect due to Reverse Tilt Domain

Figure 3:
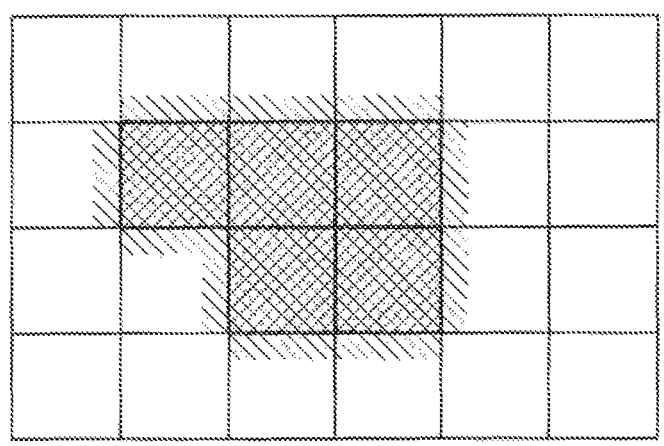
FIG. 3 is a diagram exemplifying display defects due to a reverse tilt domain.

FIG. 3 is a diagram exemplifying display defects due to a reverse tilt domain. FIG. 3 illustrates an example in which an image that is displayed by an image signal Vid-in is drawn as a pattern in which gray pixels are consecutive on a background of white pixels. In this case, a phenomenon occurs in which gradation does not become white in a portion (boundary portion) adjacent to a pattern in the background region and becomes an intermediate gradation.

It is considered that being hard to be in an orientation state according to the application voltage due to influence of horizontal electric field is one of the display defects in the liquid crystal element 120. Here, the "horizontal electric field" means an electric field in a direction (direction along an XY plane) along a surface of the element substrate 100a. In contrast to this, an electric field which is generated by a voltage that is applied between the pixel electrode 118 and the common electrode 108 is referred to as a "vertical electric field". Prior to describing the orientation state of the liquid crystal molecules, a relationship between an application voltage to and transmittivity of the liquid crystal element 120 is first described.

Figure 4:
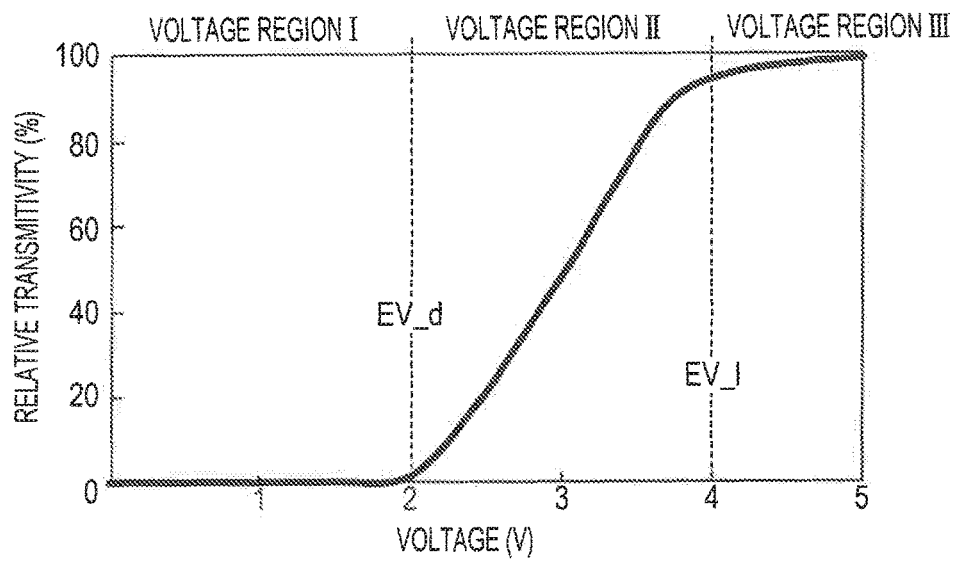
FIG. 4 is a diagram exemplifying V-T characteristics of a liquid crystal element.

FIG. 4 is a diagram exemplifying voltage-brightness characteristics of a liquid crystal element 120. In the example, the liquid crystal panel 100 is a transmissive liquid crystal panel, and thus, brightness is denoted by relative transmitivity. That is, FIG. 4 illustrates voltage-relative transitivity (so-called V-T characteristics) of the liquid crystal element 120. In the example, the liquid crystal 105 uses a vertical alignment (VA) mode, and, when a voltage is not applied, the liquid crystal element 120 uses a normally black mode of a black state (transmittivity is zero). The transmittivity slowly changes from 0% to 5% in a range where the application voltage is between 0.0 V to 2.0 V. The transmittivity rapidly changes from 5% to 95% in a range where the application voltage is between 2.0 V to 4.0 V. The transmittivity slowly changes again from 95% to 100% in a range where the application voltage is between 4.0 V to 5.0 V. In a case where the liquid crystal panel 100 is a reflective liquid crystal panel, brightness is denoted by relative reflectivity.

As such, the liquid crystal element 120 controls transmitivity thereof by using a vertical electric field, that is, a voltage which is applied between the pixel electrode 18 and the common electrode 108. However, if the liquid crystal panel 100 is miniaturized or has a high resolution, a distance between adjacent two liquid crystal elements 120 is reduced, and influence of the horizontal electric field, that is, an electric field between two pixel electrodes 118 cannot be neglected. That is, a region (reverse tilt domain) occurs in which an orientation state of liquid crystal molecules is changed to a state different from an original state (state which is controlled by a vertical electric field) by influence of a horizontal electric field.

Figure 5:
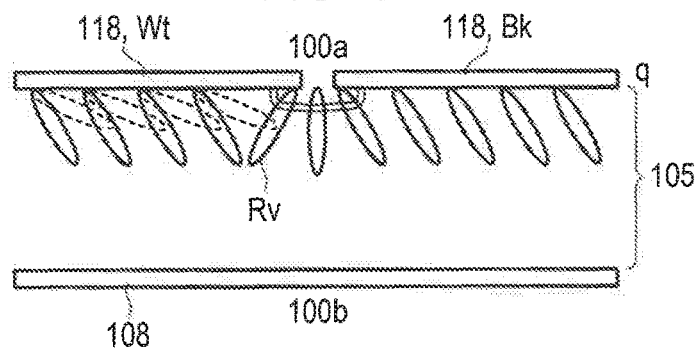
FIG. 5 is a schematic view exemplifying an orientation state of liquid crystal molecules when the reverse tilt domain is generated.

FIG. 5 is a schematic view exemplifying the orientation state of the liquid crystal molecules when the reverse tilt domain is generated. FIG. 5 illustrates a schematic view of a section perpendicular to a direction in which the element substrate 100a and the counter substrate 100b are stacked. The orientation state of the liquid crystal molecules changes to face a direction perpendicular to an electric field. In the example, a voltage corresponding to transmitivity of 0% is written to the pixel electrode 118 (Bk) in the right of the figure, and a voltage corresponding to transmittivity of 100% is written to the pixel electrode 118 (Wt) in the left of the figure. In the example, a potential difference which is generated in a gap between the pixel electrode 118 (Wt) and the pixel electrode 118 (Bk) is approximately the same as a potential difference which is generated between the pixel electrode 118 (Wt) and the common electrode 108, and a gap between the pixel electrodes 118 is narrower than a gap between the pixel electrode 118 and the common electrode 108. Hence, a horizontal electric field which is generated in a gap between the pixel electrode 118 (Wt) and the pixel electrode 118 (Bk) is stronger than a vertical electric field which is generated in a gap between the pixel electrode 118 (Wt) and the common electrode 108. In this situation, a reverse tilt domain Rv is generated in a boundary portion between the pixel electrode 118 (Wt) and the pixel electrode 118 (Bk). The reverse tilt domain Rv can be easily generated in a region where a pixel (Hereinafter, referred to as a "dark pixel") with dark gradation is adjacent to a pixel (Hereinafter, referred to as a "bright pixel") with bright gradation, due to influence of the horizontal electric field.

In the example, the liquid crystal molecules are not perpendicular to the counter substrate 100b (and the element substrate 100a) but slightly slopes in a predetermined direction (right in the example of the figure) even in a state where the application voltage is zero volts. This is called pretilt. The pretilt is given to improve responsiveness of the liquid crystal molecules with respect to the application voltage. Ease of generation of the reverse tilt domain is also related to a direction of the pretilt. For example, the reverse tilt domain is more easily generated when a direction in which the liquid crystal molecules slope due to a horizontal electric field is opposite to a direction of the pretilt, than when the direction in which the liquid crystal molecules slope due to the horizontal electric field is the same as the direction of the pretilt. In the example, the reverse tilt domain is easily generated on a boundary where the dark pixels are on the right and the bright pixels are on the left, but the reverse tilt domain is hard to be generated on a boundary where the dark pixels are on the left and the bright pixels are on the right.

As described above, conditions where the reverse tilt domain is generated are, for example, as follows.

When attention is paid to a certain pixel (referred to as a "attention pixel"), a symbol of a difference between pixels (referred to as a "target pixel") adjacent to each other in a direction along the pretilt with respect to the attention pixel has a predetermined value, and an absolute value of the difference between the application voltages is larger than a threshold.

For example, in the example of FIG. 5, the application voltage to the pixels adjacent to each other in the direction (right) of the pretilt with respect to the attention pixel is lower than the application voltage to the attention pixel, and in a case where an absolute value of a difference between the application voltage to the attention pixel and the application voltage to the target pixel is larger than the threshold, the reverse tilt domain is generated.

In a case where the pretilt is not given to the liquid crystal molecules in the liquid crystal panel 100, there is a possibility that the reverse tilt domain is generated in the pixels in the entire directions with respect to the attention pixel.

1-3. Suppression of Reverse Tilt Domain

In order to suppress generation of the reverse tilt domain., correction processing in which the aforementioned conditions are not satisfied may be performed. For example, in a case where a video signal Vid-in satisfies the aforementioned conditions and indicates there are adjacent two pixels, the application voltage is corrected to reduce the difference between the application voltages to the two pixels. Here, a boundary between the dark pixel and the bright pixel which are indicated by the video signal Vid-in that the conditions are satisfied is referred to as a "risk boundary".

The correction of the application voltage is performed for at least one of the dark pixel and the bright pixel. That is, the correction may be performed such that the application voltage to the dark pixel increases, may be performed such that the voltage to the bright pixel decreases, and may be performed such that the voltage increases or decreases. If a difference between the application voltages to the dark pixel and the bright pixel is reduced to a value lower than the threshold by the correction, the reverse tilt domain is not generated. However, the following problems are generated by the correction.

Figure 6:
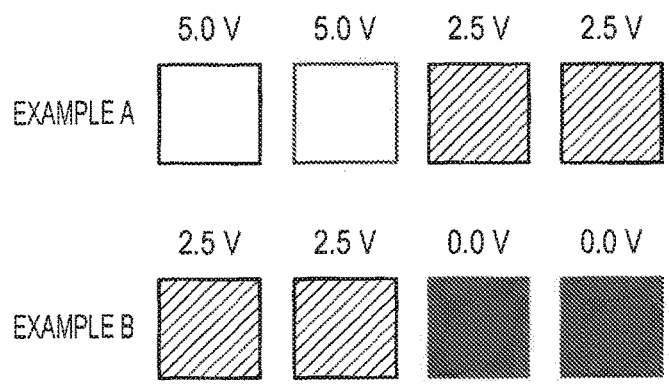
FIG. 6 is a diagram exemplifying correction of the related art.

FIG. 6 is a diagram exemplifying correction of the related art. Here, two examples of an example A and an example B are illustrated. In the example A, the application voltages to four consecutive pixels in a horizontal direction are 5.0 V, 5.0 V, 2.5 V, and 2.5 V. In the example B, the application voltages to four consecutive pixels in the horizontal direction are 2.5 V, 2.5 V, 0.0 V, and 0.0 V. In both examples, an absolute value of a potential difference on the risk boundary is 2.5 V. Now, an example is considered in which. a threshold of a potential difference in which the reverse tilt domain is generated is 2.4 V and processing of subtracting a correction value which is obtained by multiplying the potential difference by a correction coefficient of 0.2 from the application voltage to the bright pixel is performed as the correction. In this case, 0.5 V is subtracted from the application voltage to the bright pixel in both the example A and the example B. The application voltage to the bright pixel of the example A is corrected to 4.5 V, and the application voltage to the bright pixel of the example B is corrected to 2.0 V. In the example A, if the application voltage i s corrected from 5.0 V to 4.5 V, transmittivity changes from 100% to approximately 98%. Meanwhile, in the example B, if the application voltage is corrected from 2.5 V to 2.0 V, the transmittivity changes from 20% to approximately 5%.

As such, according to the correction of the related art, even if the potential differences on the risk boundary are the same, gradation according to the correction is changed significantly by the application voltage to the attention pixel. When viewed from a different viewpoint, if a change of the gradation according to the correction is reduced to a value less than or equal to a constant level even also in the situation of the example B, the correction coefficient is forced to reduce, but, if so, the amount of correction is too small, and thereby, effects of correction are reduced. This is because the V-T characteristics of a liquid crystal are nonlinear. In contrast to this, the present embodiment provides correction in which the nonlinearity of the V-T characteristics is considered. Furthermore, the present embodiment provides a technology of reducing dependence of a change of gradation before and after correction is performed and dependence of the application voltage to the attention pixel.

2. First Embodiment

2-1. Configuration of Device

Figure 7:
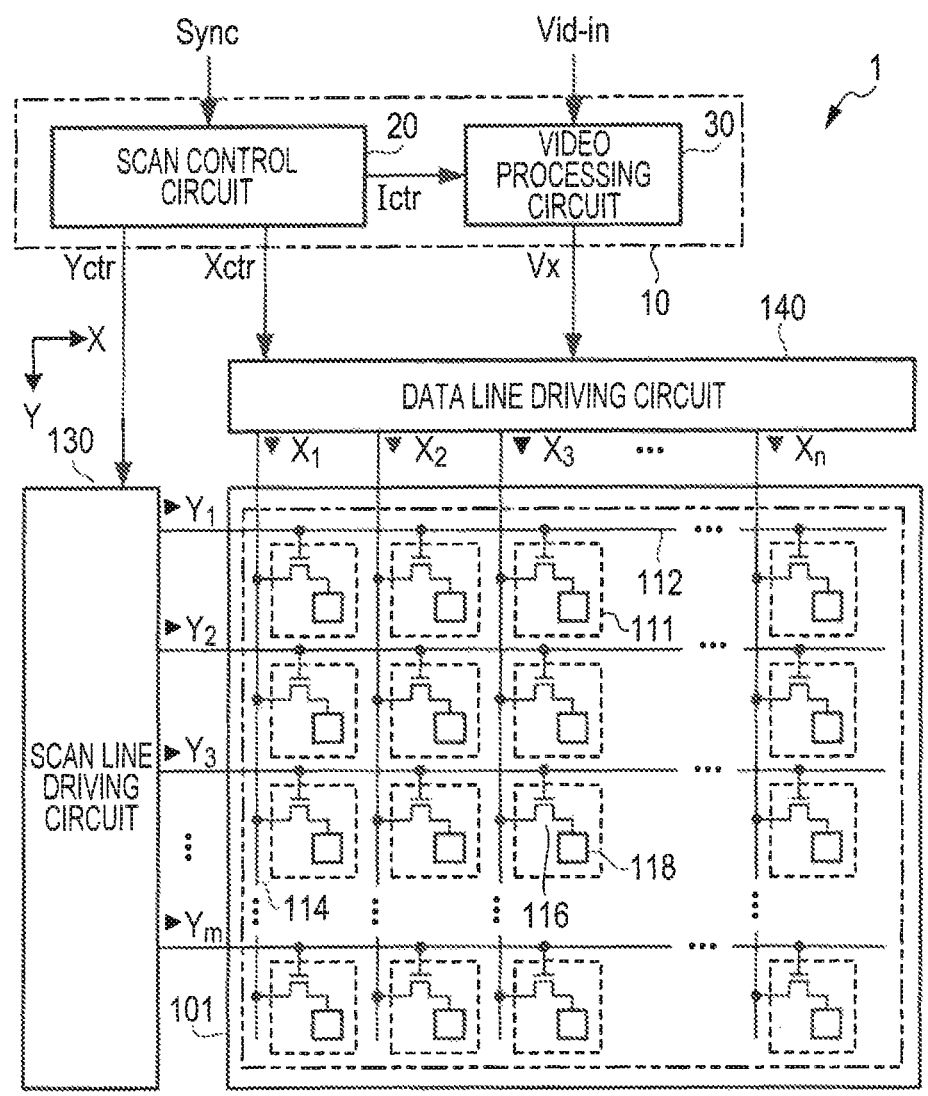
FIG. 7 is a block diagram illustrating a configuration of an electro-optical device.

FIG. 7 is a block diagram illustrating a configuration of an electro-optical device 1 according to a first embodiment. The electro-optical device 1 displays a color image, and is used as, for example, a light valve of a projector (an example of electronic apparatus). The electro-optical device 1 includes three sets of the liquid crystal panel 100, the scan line driving circuit 130, and the data line driving circuit 140, and a control circuit 10, Each set corresponds to color components different from each other, that is, a color component R (red), a color component G (green), and a color component B (blue). Here, in order to avoid complicated drawing, only one set of the liquid crystal panel 100, the scan line driving circuit 130, and the data line driving circuit 14 illustrated.

The control circuit 10 outputs a signal which controls the scan line driving circuit 30 and the data line driving circuit 140 in response to the video signal Vid-in and a synchronization signal Sync which are supplied from a higher device. The video signal Vid-in is a digital signal which designates each gradation value of each pixel in the liquid crystal panel 100. The video signal Vid-in is supplied in a state of being synchronized with the synchronization signal Sync. The synchronization signal Sync includes a vertical scan signal, a horizontal scan signal, and a dot clock signal (all the signals are not illustrated), In the example, a frequency of the video signal Vid-in is 60 Hz. That an image which is displayed by the video signal Vid-in is rewritten at each 16.67 msec.

The video signal Vid-in directly designates gradation value, but a voltage (Hereinafter, referred to as an "application voltage") which is applied to the liquid crystal element in accordance with the gradation value, and thus, it can be said that the video signal Vid-in designates the application voltage to the liquid crystal element.

The control circuit 10 includes a scan control circuit 20 and a video processing circuit 30. The scan control circuit 20 generates various control signals such as a control signal Xctr, a control signal Yctr, and a control signal Ictr, and controls each unit in synchronization with the synchronization signal Sync. The video processing circuit 30 processes the digital video signal Vid-in and outputs an analog data signal Vx for each color component The video processing circuit 30 is an example of a video processing device which processes a video signal. The video signal Vid-in is an example of an input video signal indicating gradation values of a plurality of color components in each of (m×n) pixels.

Figure 8:
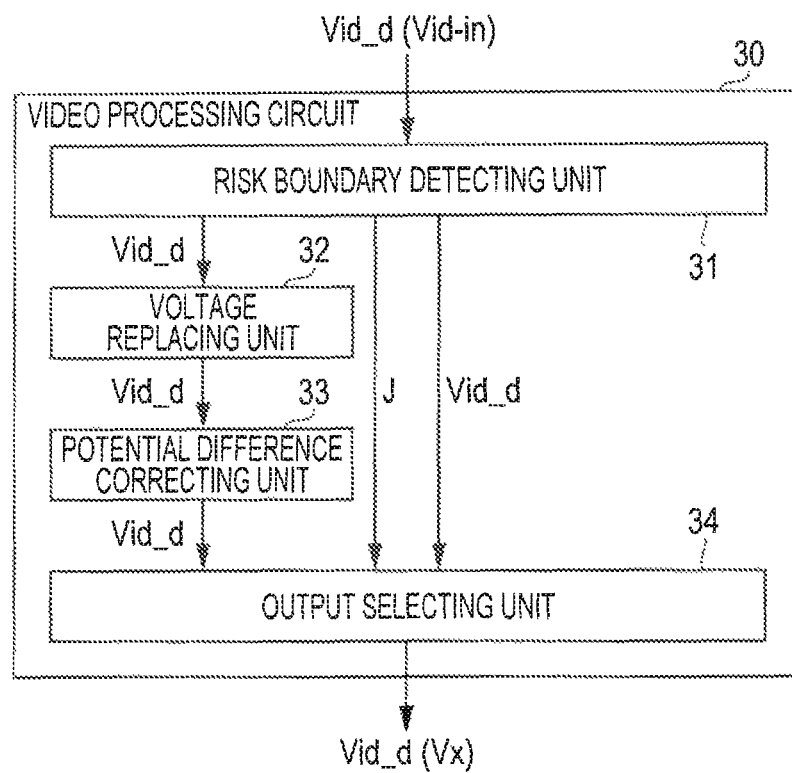
FIG. 8 is a diagram illustrating a configuration of a video processing circuit.

FIG. 8 is a diagram exemplifying a configuration of the video processing circuit 30. The video processing circuit 30 corrects an application voltage of at least one pixel of the attention pixel and the target pixel. In the present embodiment, correction of the attention pixel and the target pixel is performed in two steps. A first step is processing of replacing a voltage value. A second step is processing of reducing a potential difference between the attention pixel and the target pixel. Hereinafter, details thereof will be described.

The video processing circuit 30 includes a risk boundary detecting unit 31, a voltage replacing unit 32, a potential difference correcting unit 33, and an output selecting unit 34. The video signal Vid-in is converted from a signal a signal indicating gradation values of each pixel to a data signal Vid-d indicating application voltages of each pixel by a circuit which is not illustrated. An application voltage which is indicated by the data signal Vid-d that is not processed by the voltage replacing unit 32 and the potential difference correcting unit 33 is referred to as input data.

The risk boundary detecting unit 31 detects whether or not there is a risk boundary from the data signal Vid-d which is input, and outputs a determination signal J indicating the result. The risk boundary detecting unit 31 sequentially specifies the attention pixels from a plurality of pixels that the application voltage indicates by using the data signal Vid-d, and determines whether or not the attention pixels and the target pixel satisfy condition of the risk boundary. That is, the risk boundary detecting unit 31 is an example of a detecting unit which detects a set of a first pixel (for example, attention pixel) and a second pixel (for example, target pixel) adjacent to the first pixel, and a set of pixels in which a difference between the application voltages to the first pixel and the second pixel indicated by an input video signal is greater than or equal to a threshold, from a pixel group (a plurality of pixels 111) arranged in a first direction (for example, X direction) and a second direction (for example, Y direction). The risk boundary detecting unit 31 includes a delay circuit or a line memory to perform the determination. The risk boundary detecting unit 31 outputs the determination signal J indicating the determination result to the output selecting unit 34. For example, the determination signal J goes to a high level in a case where the attention pixel and the target pixel satisfy the condition of the risk boundary, and goes to a low level in a case where the attention pixel and the target pixel do not satisfy the condition of the risk boundary. Furthermore, the risk boundary detecting unit 31 outputs the data signal Vid-d to the voltage replacing unit 32 and the output selecting unit 34. In a case where a set of the attention pixel and the target pixel satisfies the condition of the risk boundary, a pixel whose gradation is darker is a "dark pixel" and a pixel whose gradation is brighter is a "bright pixel", among the two pixels.

In a case where a profile data condition is satisfied, the voltage replacing unit 32 replaces at least one value of the application voltage to the bright pixel and the dark pixel with a predetermined voltage value. The replacement of the voltage value is performed based on V-T characteristics of the liquid crystal element 120. A voltage region of the V-T characteristics of the liquid crystal element 120 is separated in a plurality of voltage regions in advance in accordance with a slope of a V-T curved line, that is, linearity of the V-T curved line. Information which specifies a plurality of regions in the voltage region of the V-T characteristics is stored in, for example, an internal memory (not illustrated) of the video processing circuit 30 or a memory (not illustrated) provided outside the video processing circuit 30. The voltage replacing unit 32 reads information specifying a plurality of regions in the voltage region of the V-T characteristics from the memory. That is, the voltage replacing unit 32 is an example of an acquisition unit which acquires information that specifies a plurality of regions of voltage-brightness characteristics (for example, V-T characteristics) of the pixel group (the plurality of pixels 111) and voltage-brightness characteristics in which the voltage region is separated into a plurality of regions in accordance with a slope of the voltage-brightness characteristics.

The plurality of voltage regions in the V-T characteristics will be described with reference to FIG. 4, In the example, the V-T characteristics are separated into three voltage regions of a voltage region I, a voltage region II, and a voltage region III. The voltage region is a region where the application voltage is in a range from 0 V to 2 V and the transmittivity slowly changes (slope is gentle). The voltage region II is a region where the application voltage is in a range from 2 V to 4 V and the transmittivity changes more rapidly than that of the voltage region I (slope is steep). The voltage region III is a region where the application voltage is in a range from 4 V to 5 V and the transmittivity changes more gently than that of the voltage region II (slope is gentle).

FIG. 8 is referred to again. In a case where the application voltage to the bright pixel and the dark pixel is contained in another voltage region in the V-T characteristics, the voltage replacing unit 32 replaces the application voltage to at least one pixel with another voltage value. Specifically, in a case where an application voltage to one pixel (for example, "first pixel") of the bright pixel and the dark pixel is in a region (referred to as a "first region") in the plurality of voltage regions of the V-T characteristics and an application voltage to the other pixel (for example, a "second pixel") is in a region (for example, referred to as a "second region") different from the first region, the application voltage the first pixel is replaced with a voltage in a region other than the first region and a voltage close to the second region. Here, in the replaced voltage value, a voltage value which becomes a boundary between two voltage regions is defined to be not contained in any voltage regions. In order to determine whether or not an application voltage to two pixels is contained in the same voltage region, a voltage value of a boundary is defined to be contained in both voltage regions. In the following description, which voltage region X contains (includes) the application voltage to of a certain pixel P is simply referred to as "the pixel P is contained in the voltage region X".

In more detail, in a case where the first pixel and the second pixel are contained in voltage regions different from each other, the voltage replacing unit 32 replaces an application voltage value of a pixel contained in a voltage region having a slight slope of the V-T characteristics among the first pixel and the second pixel with a voltage value of a boundary close to a voltage region that another pixel is contained.

In a case where the first pixel and the second pixel are contained in voltage region different from each other even after the voltage is replaced, replacement is performed again. That is, in a case where a voltage region of voltage-brightness characteristics is separated into three or more regions and a third region is interposed between the first region and the second region, both the application voltage to the first pixel and the second voltage are replaced with a voltage in the third region.

Further specifically, in a case where an application voltage Vdk to the dark pixel and an application voltage Vlt to the bright pixel satisfy the following expression, the voltages are replaced as follows.

$$Vdk < EV\_d \text{ and } Vlt > EV\_1 \quad (1)$$

$$Vdk = CVL \text{ and } Vlt = CVH \quad (2)$$

Here, EV_d indicates a voltage of a boundary between the voltage region I and the voltage region II, and EV_1 indicates a voltage of a boundary between the voltage region II and the voltage region III, respectively. CVL indicates a replaced voltage of the dark pixel, and CVH indicates a replaced voltage of the bright pixel, respectively. In the present embodiment, the voltages are as follows.

$$CVL = EV\_d \text{ and } CVH = EV\_1 \quad (3)$$

That is, the voltage replacing unit 32 is an example of a replacing unit which replaces an application voltage to the first pixel with a voltage (for example, CVH) which is in a region other than the first region and is close to the second region, in a case where the application voltage to the first pixel (for example, bright pixel) which is indicated by an input video signal is in the first region (for example, voltage region III) of the plurality of voltage regions and an application voltage to the second pixel (for example, dark pixel) is in the second region (for example, voltage region II) different from the first region. In addition, the replacing unit replaces a pixel contained in a voltage region where a slope of voltage-brightness characteristics is smaller in a set of pixels that are detected by the detecting unit with the first pixel.

The potential difference correcting unit 33 performs correction of reducing a potential difference between the bright pixel and the dark pixel with respect to the output signal of the voltage replacing unit 32. That the potential difference correcting unit 33 is an example of a correcting unit which corrects at least one of application voltages to the first pixel and the second pixel such that a difference between the application voltages to the first pixel and the second pixel is reduced. In the example, the potential difference correcting unit 33 subtracts a correction value which is obtained by multiplying a potential difference between the bright pixel and the dark pixel by a correction coefficient α from the application voltage to the bright pixel. In addition, the potential difference correcting unit 33 adds a correction value which is obtained by multiplying the potential difference by a correction coefficient β to the application voltage to the dark pixel. That is, the potential difference correcting unit 33 corrects the application voltages to the bright pixel and the dark pixel in accordance with the following Expression (4) and Expression. (5).

$$VltR = Vlt - \alpha \cdot (Vlt - Vdk) \quad (4)$$

$$VdkR = Vdk + \beta \cdot (Vlt - Vdk) \quad (5)$$

Here, VltR indicates the application voltage of the corrected bright pixel, and VdkR indicates the application voltage of the corrected dark pixel, respectively. Both the correction for the bright pixel and the correction for the dark pixel need not be performed, and only one of the corrections may be performed.

In the example, the correction coefficients are set in each voltage region defined in the V-T characteristics. The correction coefficient α set corresponding to the voltage regions I, II, and III are respectively referred to as α1, α2, and α3, and the correction coefficient β set corresponding to the voltage regions I, II, and III are respectively referred to as β1, β2, and β3. In the correction coefficients, the steeper the slope of the V-T characteristics in the voltage region is, the smaller the value of the correction coefficient is. In the example of FIG. 4, the slope in the voltage region II is the steepest, and thus, α2<α1, α2<α3, β2<β1, and β2<β3. For example, in a case where the dark pixel is contained in the voltage region I, the potential difference correcting unit 33 performs correction of the potential difference by using the correction coefficient β1.

The output selecting unit 34 outputs a signal which is selected from a data signal Vd-d (that is, uncorrected data signal) that is output from the risk boundary detecting unit 31 and a data signal Vd-d (that is, corrected data signal) that is output from the potential difference correcting unit 33. Specifically, the output selecting unit 34 selects the corrected data signal when a determination signal J is in a high level (when the risk boundary is detected), and selects the uncorrected signal when the determination signal J is in a low level (when the risk boundary is not detected).

An output signal of the output selecting unit 34 is converted into an analog signal by a conversion circuit which is not illustrated, and is output as a data signal Vx.

FIG. 7 is referred to again. The scan line driving circuit 130 scans a plurality of scan lines 112 at timing according to the control signal Yctr which is output from the scan control circuit 20. The data line driving circuit 140 supplies the data signal Vx which is output from the video processing circuit 30 to the data lines 114 at timing according to the control signal Xctrl which is output from the scan control circuit 20.

2-2. Operation

Figure 9:
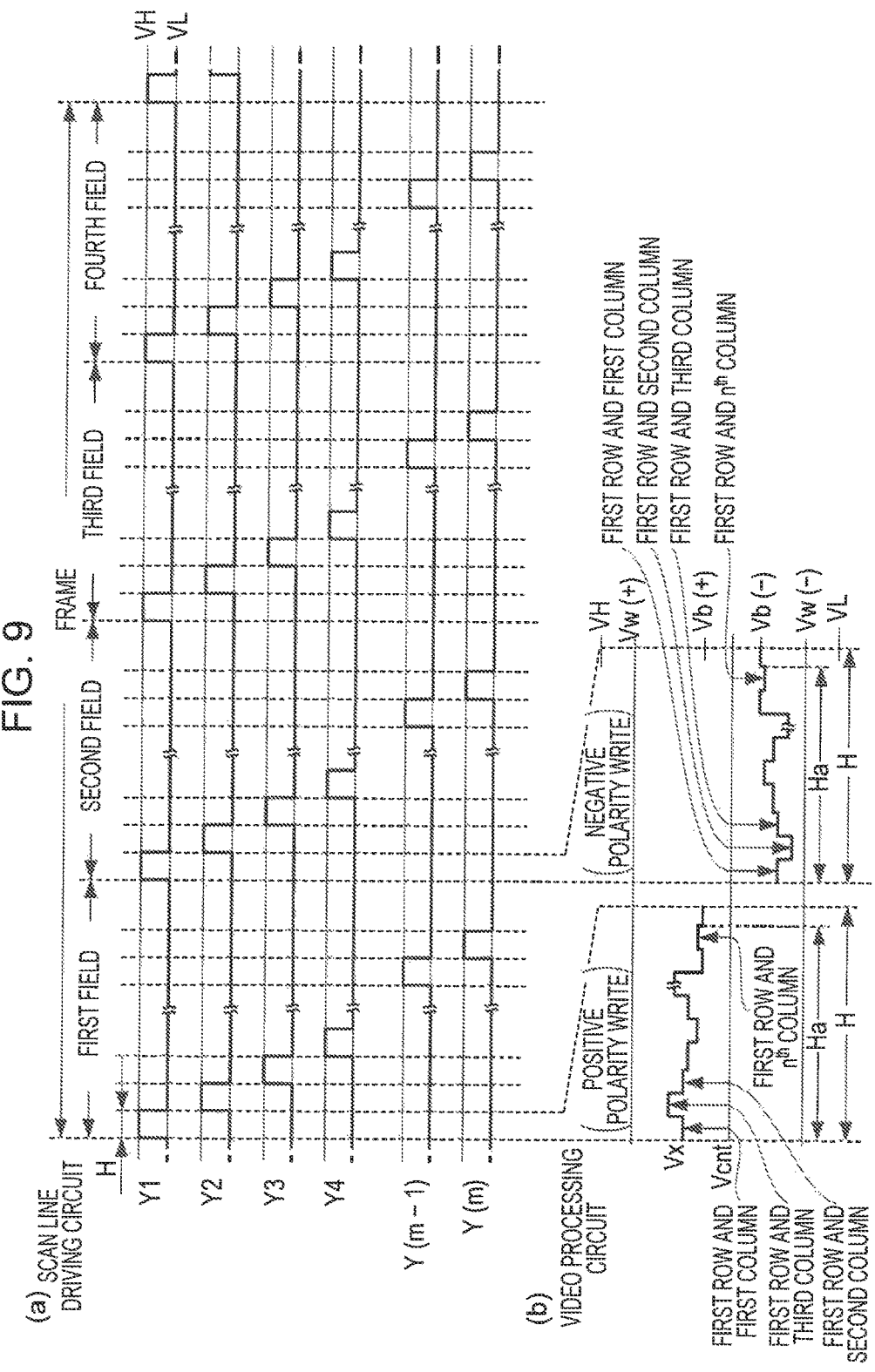
FIG. 9 is a timing chart illustrating an operation of the electro-optical device.

FIG. 9 is a timing chart illustrating an operation of the electro-optical device 1. In the example, one frame is divided into four fields, that is, so-called quadruple-speed drive is performed. For example, in a case where an image which is displayed by the video signal Vid-in is updated to 60 Hz, one frame 16.7 msec. In this case, the data signal Vx has 240 Hz, and one field is approximately 4.17 msec.

The scan line driving circuit 130 outputs the scan signal Yd which selects sequentially and exclusively the m scan lines 112 in each field. When the scan line 112 of the $i^{th}$ row is selected, the data line driving circuit 140 samples the data signal Vx of the pixel of the $i^{th}$ row and the first to $n^{th}$ column, and outputs the sampled signal as the data signals X1 to Xn. A voltage of the data signal Vx has a positive polarity in odd fields, and has a negative polarity in even fields. A medium potential of amplitude of the data signal Vx is a potential. Vent. The common voltage LCcom is set to a value lower than a medium potential Vent in consideration of influence of so-called push down (feed through).

Figure 10:
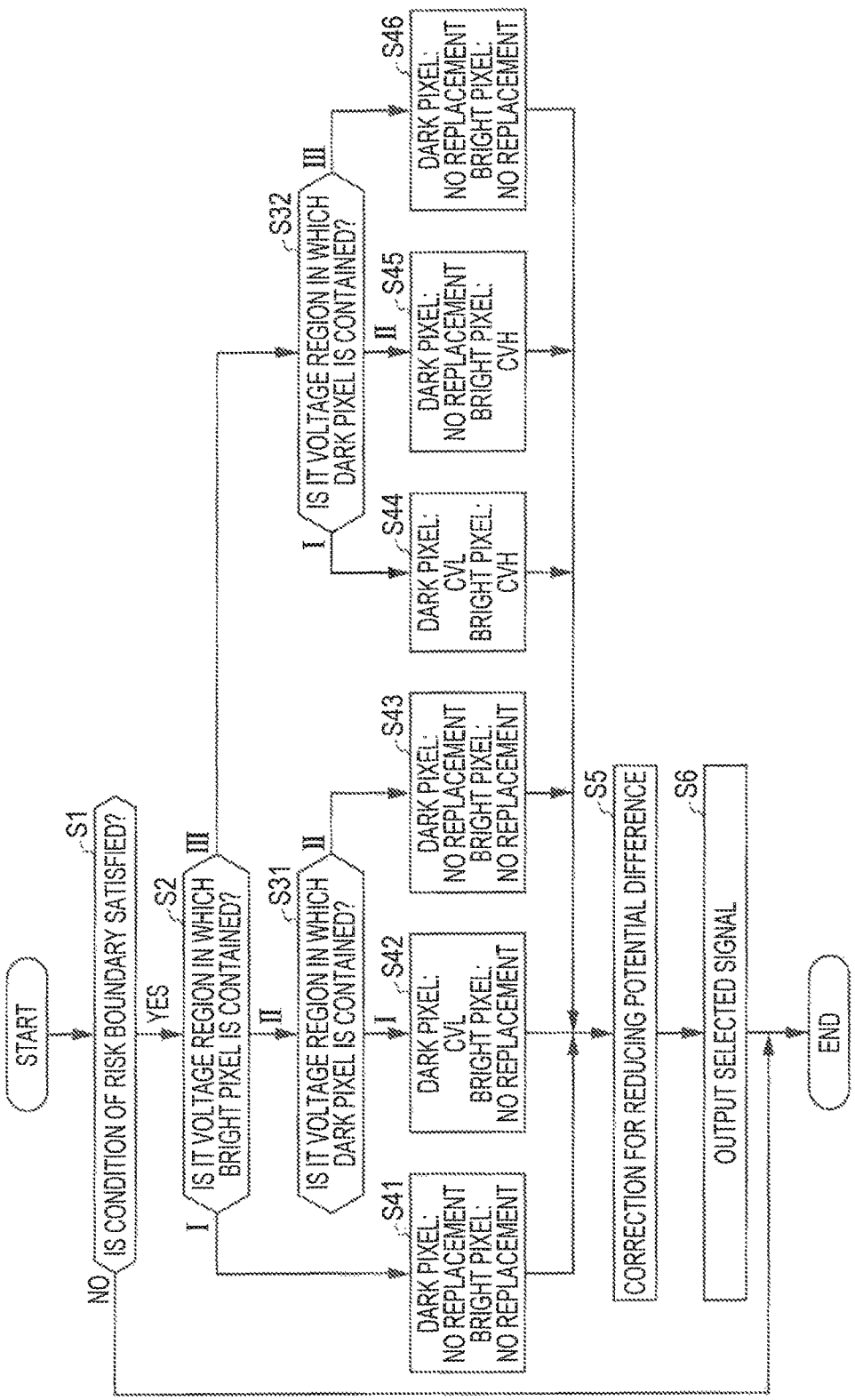
FIG. 10 is a flowchart illustrating an operation of the video processing circuit.

FIG. 10 is a flowchart illustrating an operation of the video processing circuit 30. The flow of FIG. 10 is repeatedly performed at a predetermined interval, for example, starting with supplying of power to the video processing circuit 30. The flow of FIG. 10 illustrates only processing of one pixel, and, actually, attention pixels are sequentially specified one by one from the plurality of pixels, and the flow of FIG. 10 is performed for the target pixel.

In step S1, the risk boundary detecting unit 31 determines whether or not the attention pixel and the target pixel satisfy conditions of a risk boundary, that is, the risk boundary is detected. The risk boundary detecting unit 31 outputs the determination signal J indicating the determination result. In a case where it is determined that the risk boundary is not detected (S1: NO), the video processing circuit 30 ends processing of FIG. 10 for the attention pixel. In a case where it is determined that the risk boundary is detected (S1: YES), the video processing circuit 30 moves processing to step S2.

In step S2, the voltage replacing unit 32 determines in which of the voltage regions I to III the bright pixel is contained. In a case where it is determined that the bright pixel is contained in the voltage region I (S2: I), the voltage replacing unit 32 moves processing to step S41. In a case where it is determined that the bright pixel is contained in the voltage region II (S2: II), the voltage replacing unit 32 moves the processing to step S31. In a case where it is determined that the bright pixel is contained in the voltage region III (S2: III), the voltage replacing unit 32 moves the processing to step S32.

In step S31, the voltage replacing unit 32 determines in which of the voltage regions I and II the dark pixel is contained. In a case where it is determined that the dark pixel is contained in the voltage region I (S31: I), the voltage replacing unit 32 moves the processing to step S42. In a case where it is determined that the dark pixel is contained in the voltage region II (S31: II), the voltage replacing unit 32 moves the processing to step S43.

In step S32, the voltage replacing unit 32 determines in which of the voltage regions I to III the dark pixel is contained. In a case where it is determined that the dark pixel is contained in the voltage region I (S32: I), the voltage replacing unit 32 moves the processing to step 844. In a case where it is determined that the dark pixel is contained in the voltage region II (S32: II), the voltage replacing unit 32 moves the processing to step 845. In a case where it is determined that the dark pixel is contained in the voltage region III (832: III), the voltage replacing unit 32 moves the processing to step S46.

In step S41, the voltage replacing unit 32 does not replace voltage values of the dark pixel and the bright pixel. Furthermore, the voltage replacing unit 32 notifies the potential difference correcting unit 33 that the replaced voltage value is contained in the voltage region I.

In step S42, the voltage replacing unit 32 replaces the voltage value of the dark pixel with CVL, and does not replace the voltage value of the bright pixel. Furthermore, the voltage replacing unit 32 notifies the potential difference correcting unit 33 that the replaced voltage value is contained in the voltage region II.

In step S43, the voltage replacing unit 32 does not replace the voltage values of the dark pixel and the bright pixel. Furthermore, the voltage replacing unit 32 notifies the potential difference correcting unit 33 that the replaced voltage value is contained in the voltage region II In step S44, the voltage replacing unit 32 replaces the voltage value of the dark pixel with CVL, and replaces the voltage value of the bright pixel with CVH. Furthermore, the voltage replacing unit 32 notifies the potential difference correcting unit 33 that the replaced voltage value is contained in the voltage region II.

In step S45, the voltage replacing unit 32 does not replace the voltage value of the dark pixel, and replaces the voltage value of the bright pixel with CVH. Furthermore, the voltage replacing unit 32 notifies the potential difference correcting unit 33 that the replaced voltage value is contained in the voltage region II.

In step S46, the voltage replacing unit 32 does not replace the voltage values of the dark pixel and the bright pixel. Furthermore, the voltage replacing unit 32 notifies the potential difference correcting unit 33 that the replaced voltage value is contained in the voltage region III. Steps S41 to S46 are an example of steps in which, in a case where the application voltage to the first pixel which is indicated by the input video signal is contained in a first region of a plurality of voltage regions in voltage-brightness characteristics in which a voltage region is separated into a plurality of regions in accordance with a slope, and the application voltage to the second pixel which is contained in a second region different from the first region, the application voltage to the first pixel is replaced with a voltage which is contained in a region other than the first region and is close to the second region.

Figure 11:
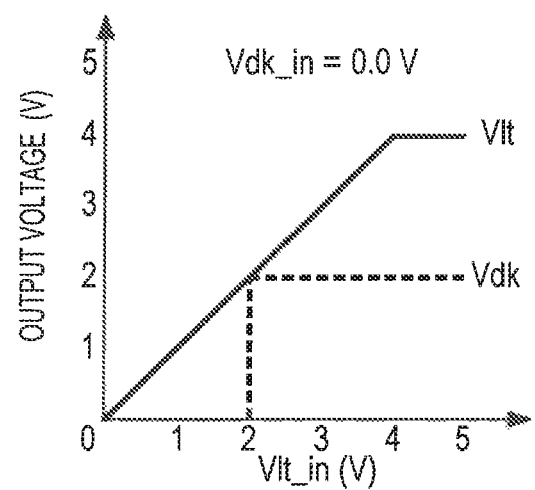
FIG. 11 is a diagram illustrating an example of voltage replacement of a voltage replacing unit.

FIG. 11 is a diagram illustrating an example of voltage replacement of the voltage replacing unit 32. The figure illustrates an example in which the application voltage of the input video signal to the dark pixel is 0.0 V. In the figure, a horizontal axis denotes an application voltage Vlt_in of the input video signal to the dark pixel, and a vertical axis denotes an output voltage. The application voltage to the dark pixel is replaced with Vdk=2.0 V in a range of Vlt_in≥2.0 V.

Figure 12:
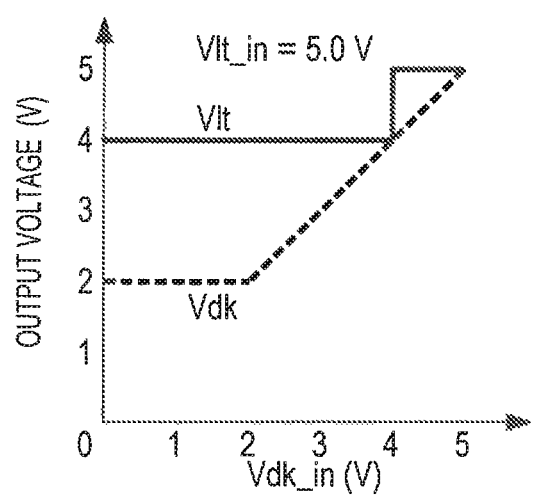
FIG. 12 is a diagram illustrating another example of the voltage replacement of a voltage replacing unit.

FIG. 12 is a diagram illustrating another example of the voltage replacement of the voltage replacing unit 32. The figure illustrates an example in which the application voltage of the input video signal to the dark pixel is 5.0 V. In the figure, a horizontal axis denotes an application voltage Vdk_in of the input video signal to the dark pixel, and a vertical axis denotes an output voltage. The application voltage to the dark pixel is replaced with Vlt=4.0 V in a range of Vdk_in 4.0 V.

FIG. 10 is referred to again. In step S5, the potential difference correcting unit 33 corrects the application voltage by using a correction coefficient corresponding to the voltage region notified from the voltage replacing unit 32.

In step S6, the output selecting unit 34 outputs a signal selected in response to the determination signal J. That is, in a case where the risk boundary is detected, a video signal which is processed by the voltage replacing unit 32 and the potential difference correcting unit 33 is output as it is, and in a case where the risk boundary is not detected, the video signal which is input is output as it is, respectively.

FIG. 13 illustrates the replaced voltage and the correction coefficient which are used for processing which is performed by the video processing circuit 30. The figure illustrates a table in which results of the processing of FIG. 10 are summarized.

FIG. 14 is a diagram illustrating an example of processing of the video processing circuit 30. In the example, the application voltage to the attention pixel is V1=5.0 V (transmittivity corresponds to 100%), and the application voltage to the target pixel is V2=2.5 V (transmittivity corresponds to 25%) in the same manner as in the example A of FIG. 6. The attention pixel is contained in the voltage region III and the target pixel is contained in the voltage region II. That is, both pixels are contained in different voltage regions from each other. The application voltage V1 is replaced with a voltage value (4.0 V) of a boundary between the voltage region II and the voltage region III. The application voltage V2 is not replaced and is maintained as it is (2.5 V). If the correction (it is assumed that α=0.2 as an example) of Expression (4) is performed for the replaced voltage value, the voltages are finally corrected as V1=3.7 V and V2=2.5 V. After the processing is performed, the transmittivity of the bright pixel is approximately 90 and the transmittivity of the dark pixel is 25%.

Figure 15:
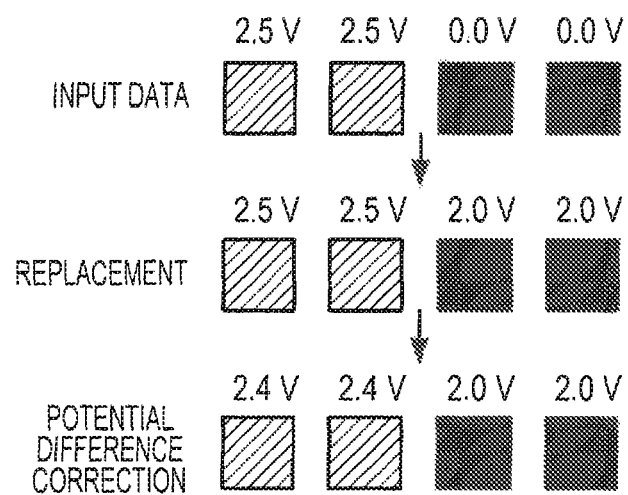
FIG. 15 is a diagram illustrating another example of the processing of the video processing circuit.

FIG. 15 is a diagram illustrating another example of the processing of the video processing circuit. 30. In the example, the application voltage to the attention pixel is V1=2.5 V (transmittivity corresponds to 25%), and the application voltage to the target pixel is V2=0.0 V (transmittivity corresponds to 0%) in the same manner as in the example B of FIG. 6. The attention pixel is contained in the voltage region II and the target pixel is contained in the voltage region I. That is, both pixels are contained in different voltage regions from each other. The application voltage V1 is not replaced and is maintained as it is (2.5 V). The application voltage V2 is replaced with a voltage value (2.0 V) of a boundary between the voltage region I and the voltage region II. If the correction (it is assumed that α=0.2) of Expression (4) is performed for the replaced voltage value, the voltages are finally corrected as V1=2.4 V and V2=2.0 V. After the processing is performed, the transmittivity of the bright pixel is approximately 20%, and the transmittivity of the dark pixel is 5%.

In the examples of FIG. 6, the gradation of the bright pixel is changed from 100% to approximately 95% by the correction in the example A, whereas the gradation of the bright pixel is changed from 25% to approximately 5% in the example B. As such, the amounts of change of the gradation according to the correction are significantly different from each other. In contrast to this, according to the correction of the present embodiment, the gradation of the bright pixel changes from 100% to approximately 90% in the example of FIG. 14, and meanwhile, the gradation of the correction changes from approximately 25% to approximately 20% in the example of FIG. 15. As such, a difference between the amounts of gradation before and after the correction performed is reduced, that is, dependence on the application voltage is reduced.

3. Second Embodiment

Figure 16:
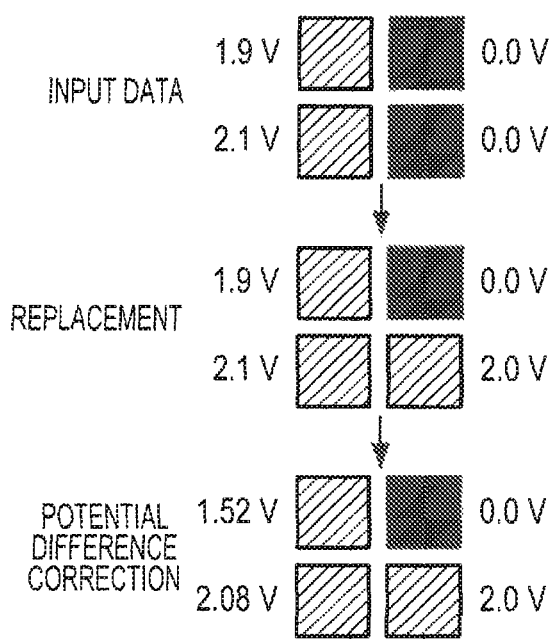
FIG. 16 is a diagram illustrating an example of processing of a video processing circuit according to a first embodiment.

FIG. 16 is a diagram illustrating an example of the processing of the video processing circuit according to a first embodiment. In the example, four pixels of two rows and two columns around the center are extracted from pixels whose gradation of the right half is 0% and whose gradation of the left half gradually changes in a vertical direction. The application voltages to the pixels in the left column are 1.9 V and 2.1 V from the top, and the application voltages to the pixels in the right column are all 0.0 V. A potential difference is 1.8 V or greater as a determination condition of the risk boundary, and the risk boundary is vertically continuous in the example, If processing according to the first embodiment is performed for the pixels, the application voltage to the pixel on the right bottom is first replaced with 2.0 V by the voltage replacing unit 32. The application voltages to the pixels other than the pixel on the right bottom are not replaced. Next, the potential difference correcting unit 33 performs correction for the replaced voltage value, Here, the potential difference of the risk boundary in an upper row is 1.9 V, and the potential difference of the risk boundary in a low row is 0.1 V. If the amount of correction which is obtained by multiplying the potential difference by the correction coefficient is subtracted from the application voltage to the bright pixel, the application voltage to the pixel on the left top becomes 1.52 V, and the application voltage to the pixel on the left bottom becomes 2.08 V. Meanwhile, the application voltage to the pixel on the right top is 0.0 V, and the application voltage to the pixel on the right bottom is 2.0 V. That is, although the two pixels in the right column have the same gradation in the input video signal, the voltage value becomes significantly different by replacement of the voltage value. A boundary between portions where the voltage values are different from each other is visually recognized by V-T characteristics of liquid crystal, and thereby, there is a possibility that the replacement of the voltage value is visually recognized as a display failure.

A second embodiment copes with the aforementioned problem. One of the causes of the aforementioned problem is that the corrected voltage values (CVL and CVH) are fixed to a certain value. Thus, in the second embodiment, the CVL and CVH are determined according to the application voltage to the attention pixel or the target pixel near the boundary between the voltage regions. Furthermore, in the second embodiment, the correction coefficient which is used for the potential difference correcting unit 33 is also determined according to the application voltage to the attention pixel or the target pixel.

Figure 17:
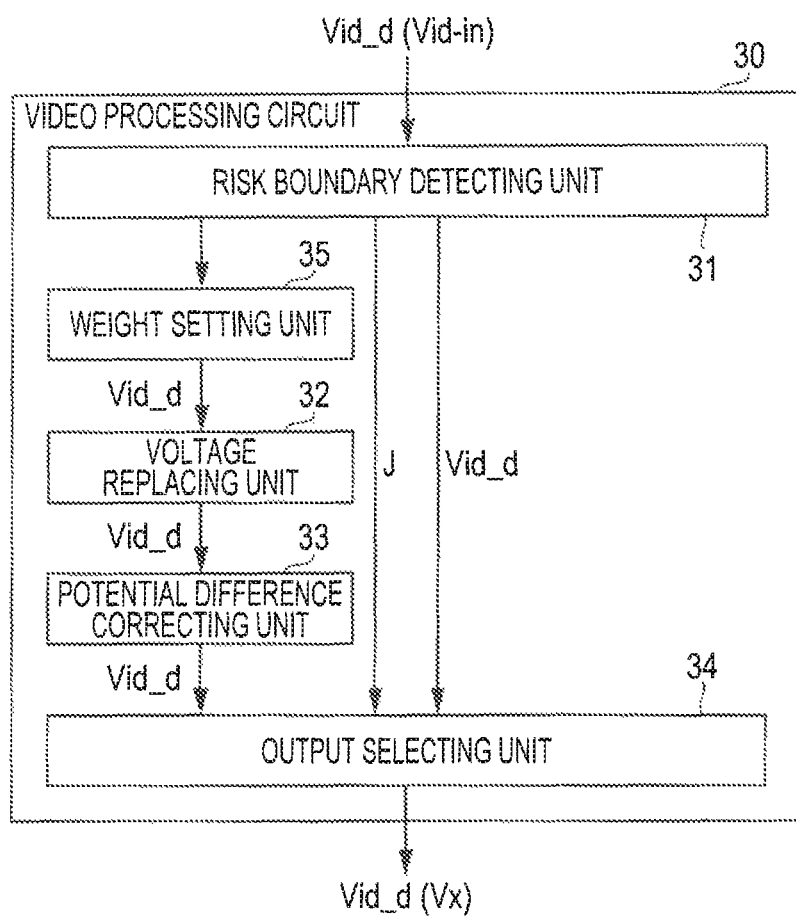
FIG. 17 is a diagram exemplifying a configuration of the video processing circuit according to a second embodiment.

FIG. 17 is a diagram exemplifying a configuration of the video processing circuit 30 according to the second embodiment. The video processing circuit 30 according to the second embodiment includes a weight setting unit 35 in addition to the configuration described in the first embodiment. The weight setting unit 35 sets a weight coefficient for changing the replaced voltage and the correction coefficient in accordance with the application voltage to the attention pixel or the target pixel.

Specifically, the weight setting unit 35 sets a weight coefficient w in accordance with voltage values of the attention pixel and the target pixel which are indicated by the data signal Vd_d which is input, and outputs information indicating the set weight coefficient w.

Figure 18:
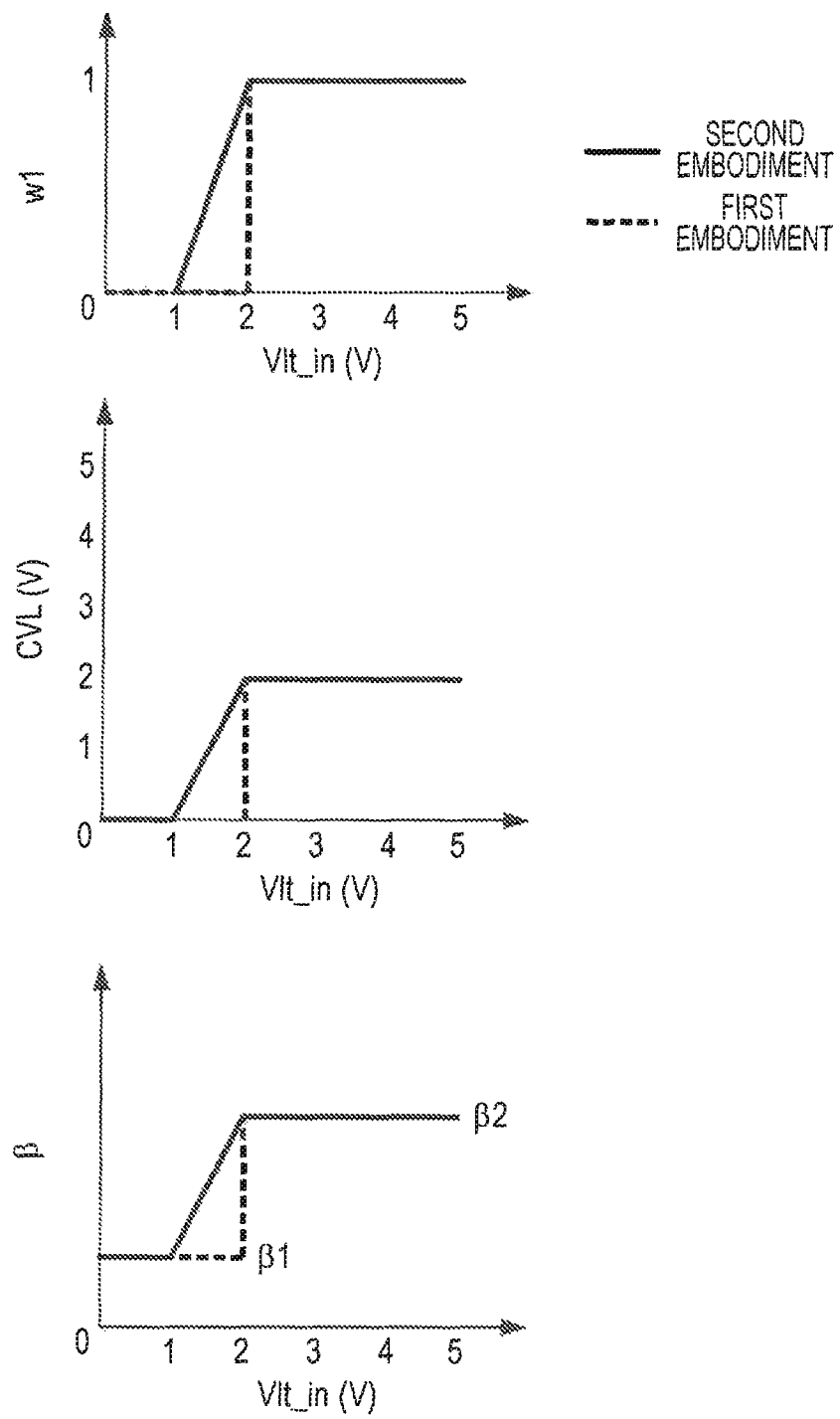
FIG. 18 is a diagram exemplifying a weight coefficient in a case where a dark pixel is contained in a voltage region.

FIG. 18 is a diagram exemplifying the weight coefficient w1, the replaced voltage CVL, and the correction coefficient β in a case where the dark pixel is contained in the voltage region I. A horizontal axis denotes the application voltage Vlt_in of the input video signal to the bright pixel. Here, for comparison, changes of the replaced voltage CVL and the correction coefficient β according to the first embodiment are descried together. In addition, a weight coefficient is not described in the first embodiment, but a weight coefficient in a case where it is assumed that a weight coefficient is used is also described.

The weight coefficient is defined according to which voltage regions respectively include the dark pixel and the bright pixel. In the example, a boundary between the voltage region I and the voltage region II is 2.0 V, and, in contrast to this, a weight coefficient w1 continuously increases from 0 to 1 in a range of 1.0 V≤Vlt_in≤2.0 V. In the range, the replaced voltage CVL is calculated by Expression (6) and the correction coefficient β is calculated by Expression (7), respectively.

$$CVL = w1 \cdot CVL0 \quad (6)$$

$$\beta = w1 \cdot (\beta2 - \beta1) + \beta1 \quad (7)$$

Here, CVL0 indicates a maximum value of the replaced voltage.

In the example, the replaced voltage CVL continuously changes from 0.0 V to 2.0 V in the range of 1.0 V≤Vlt_in≤2.0 V. In addition, in the range, the correction coefficient continuously changes from β1 to β2.

Figure 19:
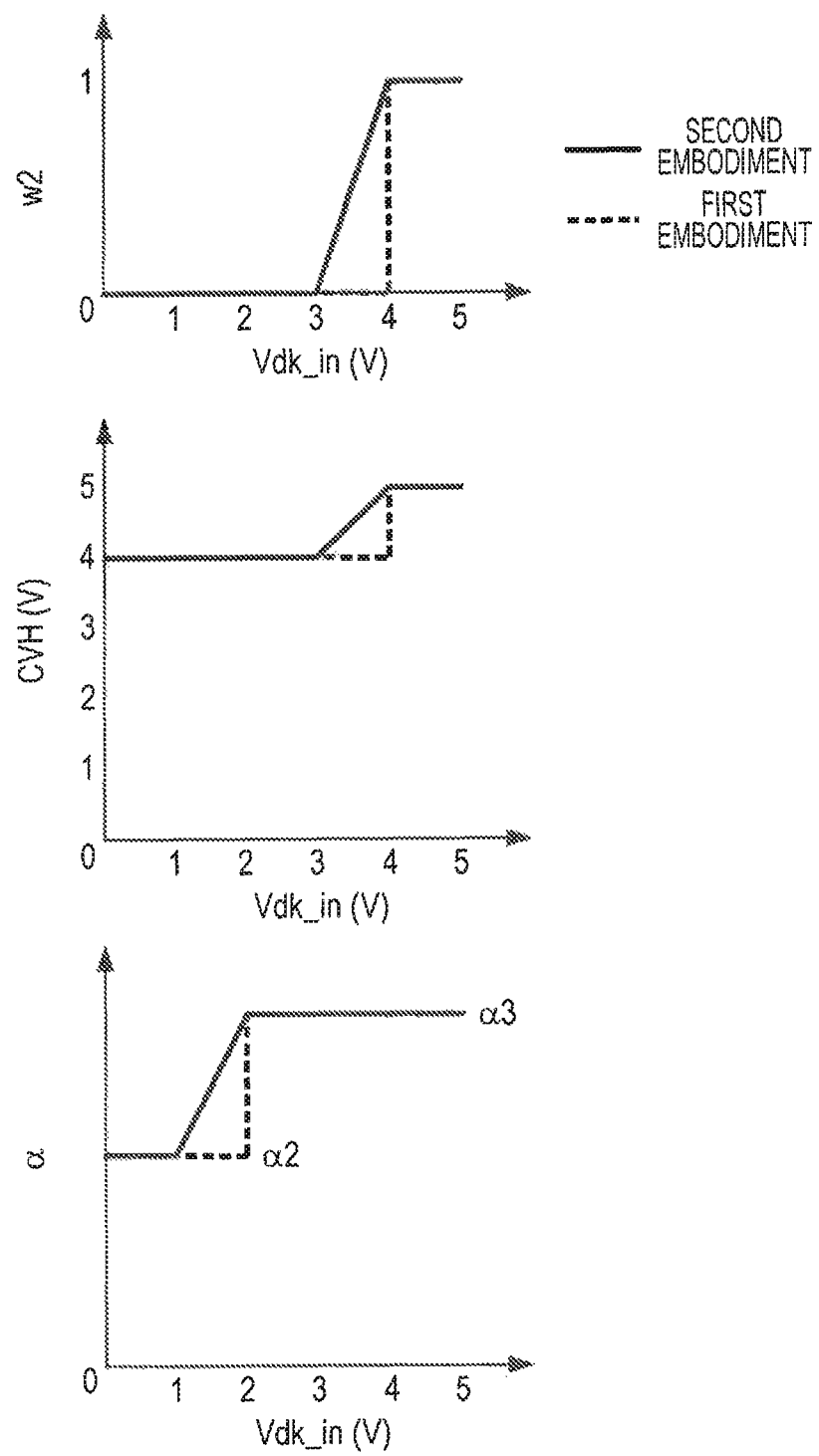
FIG. 19 is a diagram exemplifying another weight coefficient in a case where the bright pixel is contained in another voltage region.

FIG. 19 is a diagram exemplifying a weight coefficient w2, the replaced voltage CVH, and the correction coefficient α in a case where the bright pixel is contained in the voltage region III. A horizontal axis denotes the application voltage Vdk_in of the input video signal to the dark pixel. In the example, a boundary between the voltage region II and the voltage region III is 4.0 V, and, in contrast to this, a weight coefficient w2 continuously increases from 0 to 1 in a range of 3.0 V≤Vdk_in≤4.0 V. in the range, the replaced voltage CVH is calculated by Expression (8) and the correction coefficient α is calculated by Expression (9), respectively.

$$CVH = w2 \cdot CVH0 \quad (8)$$

$$\alpha = w2 \cdot (\alpha3 - \alpha2) + \alpha2 \quad (9)$$

Here, CVH0 indicates a maximum value of the replaced voltage.

In the example, the replaced voltage CVH continuously changes from 3.0 V to 4.0 V in the range of 3.0 V≤Vlt≤4.0 V. In addition, the correction coefficient continuously changes from α2 to α3 in the range of 3.3 V≤Vlt≤4.0 V.

In a case where the application voltage to the dark pixel is contained in the voltage region II or the voltage region III, the weight coefficient w1 is w1=1. In a case where the application voltage to the bright pixel is contained in the voltage region I or the voltage region II, the weight coefficient w2 is w2=1.

Figure 20:
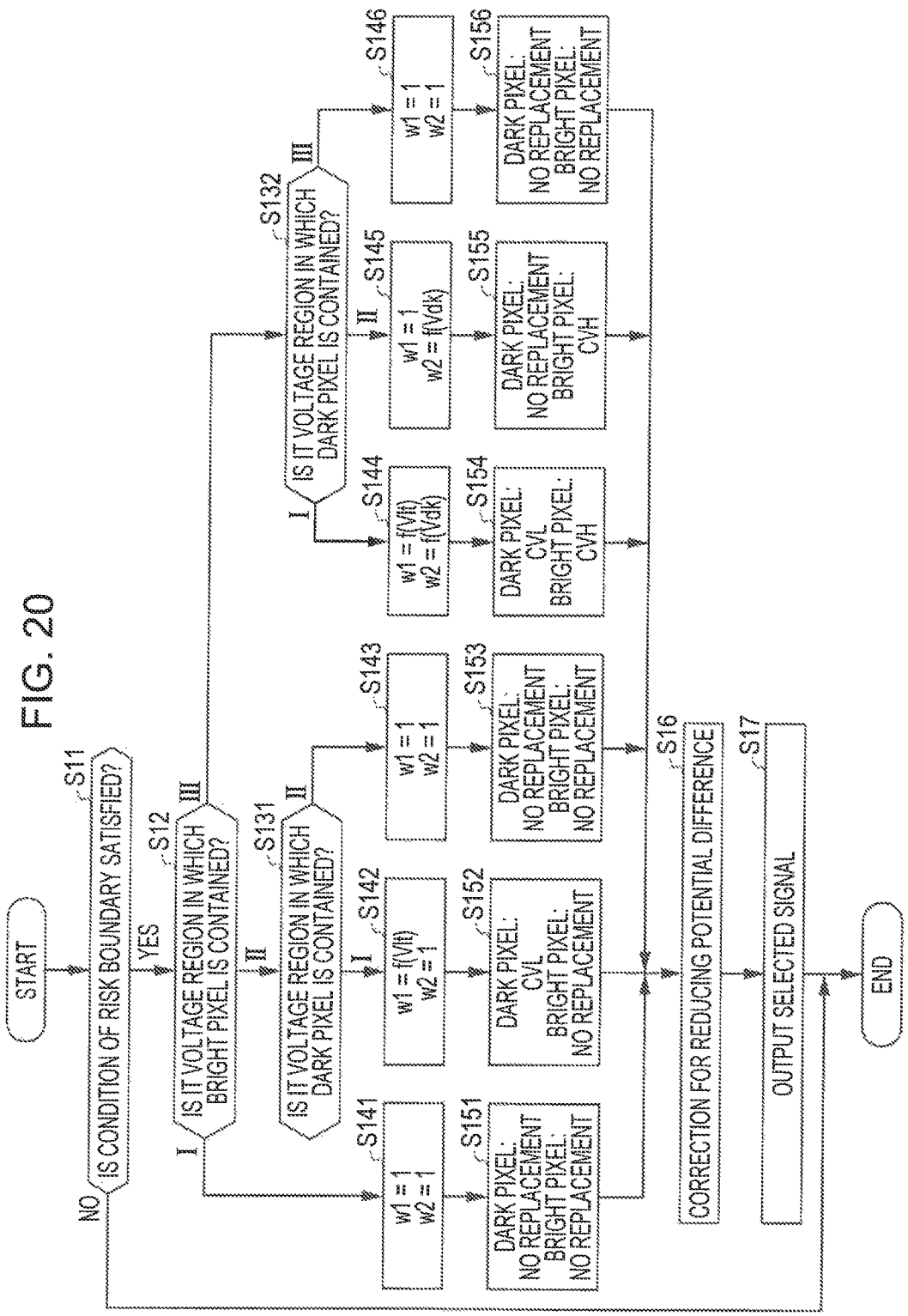
FIG. 20 is a flowchart illustrating an operation of the video processing circuit according to the second embodiment.

FIG. 20 is a flowchart illustrating an operation of the video processing circuit 30 according to the second embodiment. In step S11, the risk boundary detecting unit 31 determines whether or not the attention pixel and the target pixel satisfy conditions of the risk boundary, that is, the risk boundary is detected. The risk boundary detecting unit 31 outputs the determination signal J indicating the determination result. In a case where it is determined that the risk boundary is not detected (S11: NO), the video processing circuit 30 ends processing of FIG. 10 for the attention pixel. In a case where it is determined that the risk boundary is detected (S11: YES), the video processing circuit 30 moves processing to step S12.

In step S12, the weight setting unit 35 determines in which of the voltage regions I to III the bright pixel is contained. In a case where it s determined that the bright pixel is contained the voltage region I (S12: I), the weight setting unit 35 moves processing to step S141. In a case where it determined that the bright pixel is contained in the voltage region II (S12: II), the weight setting unit 35 moves the processing to step S131. In a case where it is determined that the bright pixel is contained in the voltage region III (S12: III), the weight setting unit 35 moves the processing to step S132.

In step S131, the weight setting unit 35 determines in which of the voltage regions I and II the dark pixel is contained. In a case where it is determined that the dark pixel is contained in the voltage region I (S131: I), the weight setting unit 35 moves the processing to step S142. In a case where it is determined that the dark pixel is contained in the voltage region II (S131: II), the weight setting unit 35 moves the processing to step S143.

In step S132, the weight setting unit 35 determines in which of the voltage regions I to III the dark pixel is contained. In a case where it is determined that the dark pixel is contained in the voltage region I (S132: I), the weight setting unit 35 moves the processing to step S144. In a case where it is determined that the dark pixel is contained in the voltage region II (S132: II), the weight setting unit 35 moves the processing to step S145. In a case where it is determined that the dark pixel is contained in the voltage region III (S132: III), the weight setting unit 35 moves the processing to step S146.

In step S141, the weight setting unit 35 sets the weight coefficients w1 and w2 to w1=w2=1. The weight setting unit 35 notifies the voltage replacing unit 32 and the potential difference correcting unit 33 of the set weight coefficients.

In step S142, the weight setting unit 35 sets the weight coefficient w1 in accordance with a relationship (referred to as w1=f(Vlt)) of FIG. 18, and sets the weight coefficient w2 to w2=1. The weight setting unit 35 notifies the voltage replacing unit 32 and the potential difference correcting unit 33 of the set weight coefficient.

In step S143, the weight setting unit 35 sets the weight coefficients w1 and w2 to w1=w2=1. The weight setting unit 35 notifies the voltage replacing unit 32 and the potential difference correcting unit 33 of the set weight coefficients.

In step S144, the weight setting unit 35 sets the weight coefficient w1 in accordance with the relationship of FIG. 18, and sets the weight coefficient w2 in accordance with a relationship (referred to as w2=f(Vdk)) of FIG. 19. The weight setting unit 35 notifies the voltage replacing unit 32 and the potential difference correcting unit 33 of the set weight coefficients.

In step S145, the weight setting unit 35 sets the weight coefficient w1 to w1=1, and sets the weight coefficient w2 in accordance with the relationship of FIG. 19. The weight setting unit 35 notifies the voltage replacing unit 32 and the potential difference correcting unit 33 of the set weight coefficients.

In step S146, the weight setting unit 35 sets the weight coefficients w1 and w2 to w1=w2=1. The weight setting unit 35 notifies the voltage replacing unit 32 and the potential difference correcting unit 33 of the set weight coefficients.

In step S151, the voltage replacing unit 32 does not replace the voltage values of the dark pixel and the bright pixel. Furthermore, the voltage replacing unit 32 notifies the potential difference correcting unit 33 that the replaced voltage value is contained in the voltage region I.

In step S152, the voltage replacing unit 32 replaces the voltage value of the dark pixel with CVL which is calculated by Expression (6), and does not replace the voltage value of the bright pixel. Furthermore, the voltage replacing unit 32 notifies the potential difference correcting unit 33 that the replaced voltage value is contained in the voltage region II.

In step S153, the voltage replacing unit 32 does not replace the voltage values of the dark pixel and the bright pixel. Furthermore, the voltage replacing unit 32 notifies the potential difference correcting unit 33 that the replaced voltage value is contained in the voltage region II.

In step S154, the voltage replacing unit 32 replaces the voltage value of the dark pixel with CVL which is calculated by Expression (6), and replaces the voltage value of the bright pixel with CVH which is calculated by Expression (8). Furthermore, the voltage replacing unit 32 notifies the potential difference correcting unit 33 that the replaced voltage value is contained in the voltage region II.

In step S155, the voltage replacing unit 32 does not replace the voltage value of the dark pixel, and replaces the voltage value of the bright pixel with CVH which is calculated by Expression (8). Furthermore, the voltage replacing unit 32 notifies the potential difference correcting unit 33 that the replaced voltage value is contained in the voltage region II.

In step S156, the voltage replacing unit 32 does not replace the voltage values of the dark pixel and the bright pixel. Furthermore, the voltage replacing unit 32 notifies the potential difference correcting unit 33 that the replaced voltage value is contained in the voltage region III. Steps S151 to S156 are an example of steps in which, in a case where the application voltage to the first pixel which is indicated by the input video signal is contained in a first region of a plurality of voltage regions in voltage-brightness characteristics in which a voltage region is separated into a plurality of regions in accordance with a slope, and the application voltage to the second pixel which is contained in a second region different from the first region, the application voltage to the first pixel is replaced with a voltage which is contained in a region other than the first region and is close to the second region.

Figure 21:
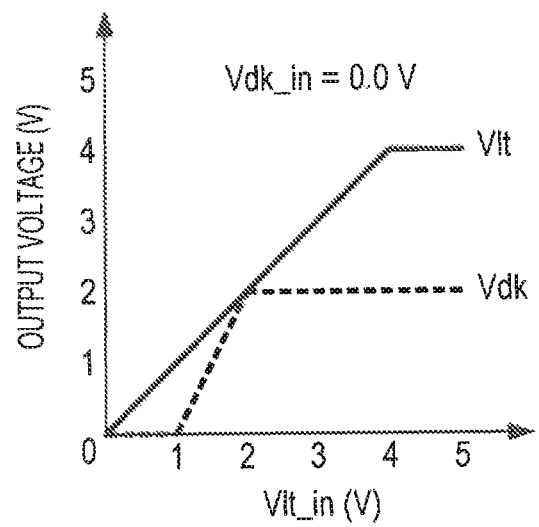
FIG. 21 is a diagram illustrating an example of voltage replacement of a voltage replacing unit according to the second embodiment.

FIG. 21 is a diagram illustrating an example of voltage replacement of the voltage replacing unit 32 according to the second embodiment. The figure illustrates an example in which the application voltage Vdk_in of the input video signal to the dark pixel is 0.0 V. In the figure, a horizontal axis denotes the application voltage Vlt_in of the input video signal to the bright pixel, and a vertical axis denotes an output voltage. When compared with FIG. 11, the difference is that Vdk continuously increases from 0.0 V to 2.0 V in a range of 1.0 V≤Vlt_in≤2.0 V.

Figure 22:
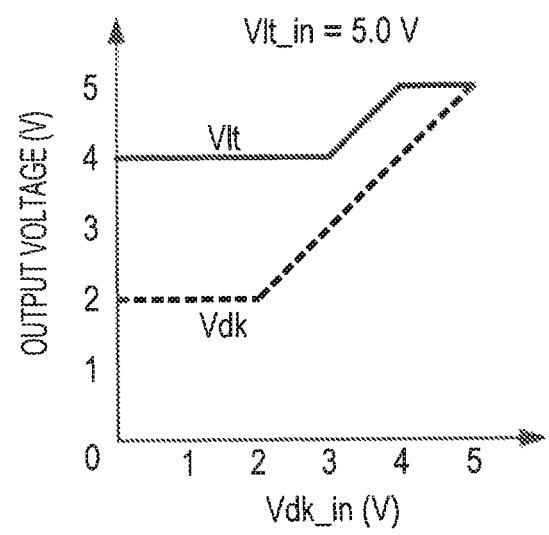
FIG. 22 is a diagram illustrating another example of the voltage replacement of the voltage replacing unit according to the second embodiment.

FIG. 22 is a diagram illustrating another example of the voltage replacement of the voltage replacing unit 32 according to the second embodiment. The figure illustrates an example in which the application voltage of the input video signal to the bright pixel is 5.0 V. In the figure, a horizontal axis denotes the application voltage Vdk_in of the input video signal to the dark pixel, and a vertical axis denotes an output voltage. When compared with FIG. 12, the difference is that Vlt continuously increases from 4.0 V to 5.0 V in a range of 3.0 V≤Vdk_in≤4.0 V.

In step S16, the potential difference correcting unit 33 corrects the application voltage by using the correction coefficient which corresponds to the voltage region notified from the voltage replacing unit 32 and is calculated by Expression (7) or (9). For example, in a case where the application voltage Vlt to the bright pixel is corrected, the corrected application voltage VltR to the attention pixel is calculated by Expression (4).

In step S17, the output selecting unit 34 outputs a signal selected in response to the determination signal J.

FIG. 23 is a diagram illustrating an example of the processing of the video processing circuit 30 according to the second embodiment. In the example, 22 pixels of 11 rows and two columns around the center are extracted from pixels whose gradation of the right half is 0% and whose gradation of the left half gradually changes in a vertical direction. The application voltages to the pixels of the example increase from 1.1 V to 3,1 V by 0.2 V sequentially from the top, and the application voltages to the pixels in the right column are all 0.0 V. The determination condition of the risk boundary is that the potential difference is 1.0 V or higher, and in the example, the risk boundary is vertically continuous. If the processing according to the second embodiment is performed for the pixels, the application voltages to the pixel of the first to fifth row in the right column gradually change from 0.2 V to 2.0 V, and the rapid change of the replaced voltage which is viewed from the processing (FIG. 16) of the first embodiment is reduced (This is briefly illustrated in the figure because gradation is hard to illustrate)

4. Application Example

Figure 24:
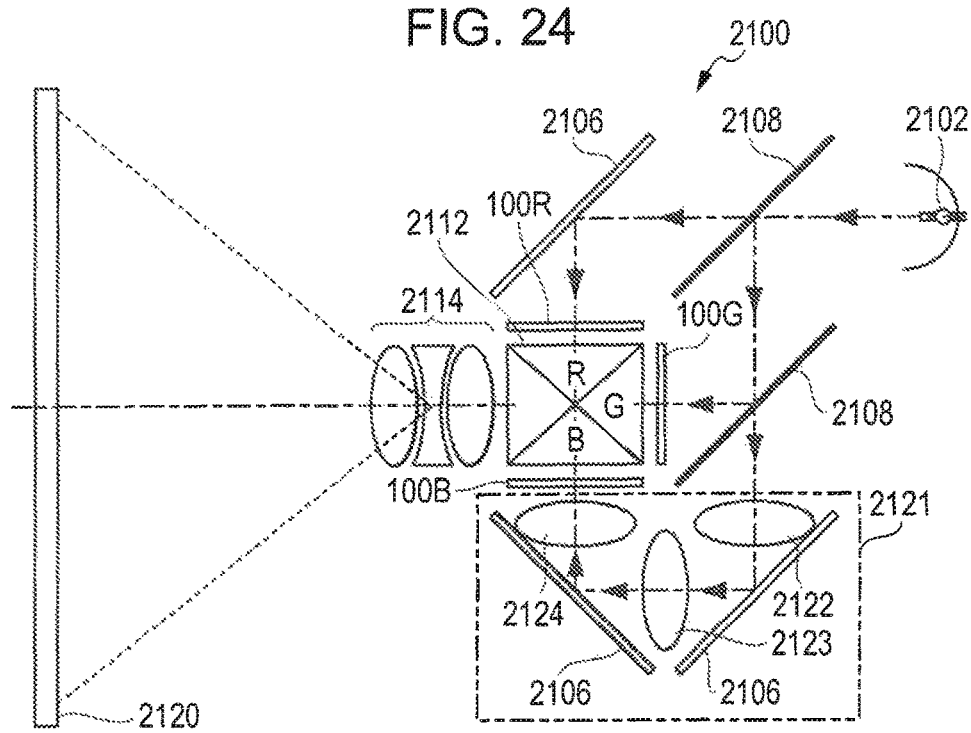
FIG. 24 is a view exemplifying a projector according to an embodiment.

FIG. 24 is a view exemplifying a projector 2100 according to an embodiment. The projector 2100 is an example of an electronic apparatus which uses the electro-optical device 1. The liquid crystal panel 100 is used as a light valve in the projector 2100. As illustrated in the figure, a lamp unit 2102 having a white light source such as a halogen lamp is provided inside the projector 2100. Projection light emitted from the lamp unit 2102 is divided into three primary colors of R (red), G (green), and B (blue) by three mirrors 2106 and two Dichroic mirrors 2108 which are disposed inside the projector. The divided projection lights are respectively led into the light valves 100R, 100G, and 100B corresponding to each primary colors. The light of the B color has a longer light path than the other lights of the R color and the G color, and thus, the light of the B color is led through a relay lens system 2121 having an incident lens 2122, a relay lens 2123, and an output lens 2124 so as to reduce loss thereof.

Three sets of liquid crystal display devices, each including the liquid crystal panel 100, are provided corresponding to each of the R color, the G color, and the B color, in the projector 2100. Configurations of the light valves 100R, 100G, and 100B are the same as those in the aforementioned liquid crystal panel 100. Each of video signals which designate gradation levels of primary color components of each of the R color, the G color, and the B color is supplied from an external high-level circuit, and each of the light valves 100B, 100G, and 100B is driven by the control circuit 10. The lights which are respectively modulated by the light valves 100R, 100G, and 100B are incident on a Dichroic prism 2112 from three directions. The lights of the R color and the B color are refracted at 90 degrees and the light of the G color goes straight, in the Dichroic prism 2112. Hence, images of each primary color are synthesized, and thereafter, a color image is projected onto a screen 2120 by a projection lens group 2114.

Lights corresponding to each of the R color, the G color, and the B color are incident on the light valves 100R, 100G, and 100B by the Dichroic mirrors 2108, and thus, a color filter need not be provided. In addition, transmission images of the light valves 100R and 100B are reflected by the Dichroic prism 2112 and are projected, whereas a transmission image of the light valve 100G is projected as it is. Hence, a horizontal scan direction of light which is controlled by the light valves 100R and 100B is opposite to a horizontal scan direction of light which is controlled by the light valve 100G, and are configured to display an image in which the left and the right are reversed.

In addition to the projector exemplified in FIG. 24, a television, a viewfinder type/direct viewing type video tape recorder, a car navigation device, a pager, an electronic notebook, a calculator, a word processor, a workpiece station, a videophone, a POS terminal, a digital still camera, a mobile phone, an apparatus including a touch panel, or the like can be used as an electronic apparatus which is used for the electro-optical device 1.

5. Modification Example

The invention is not limited to the aforementioned embodiments, and various modifications can be made. Hereinafter, several modification example will be described. Among the following modification examples, two or more may be combined to be used.

5-1. Modification Example 1

Figure 25:
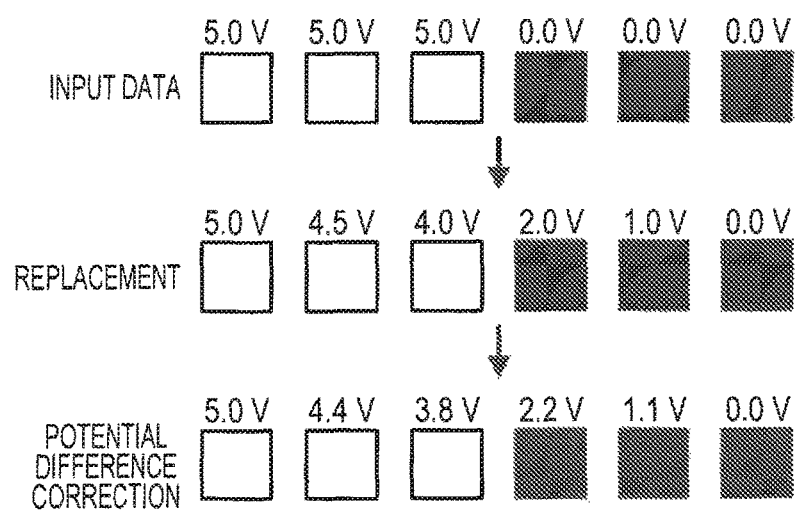
FIG. 25 is a diagram exemplifying potential difference correction according to a modification example 1.

FIG. 25 is a diagram exemplifying potential difference correction according' to a modification example 1. The number of pixels which become targets of potential difference correction is not limited to those exemplified in the embodiment. In the modification example 1, application voltages are respectively corrected at both sides of the risk boundary by application voltages of two pixels. In the example, application voltages to six pixels which are consecutive in a horizontal direction are 5.0 V, 5.0 V, 5.0 V, 0.0 V, 0.0 V, and 0.0 V.

In the example, parameters such as CVL, CVH, EV_d, EV_l, $\alpha$, and $\beta$ are set to different values in accordance with a distance from a risk boundary. For example, the pixels adjacent to the risk boundary are set to CVL=2.0 V and CVH=4.0 V, and the pixels separated by one pixel from the risk boundary are set to CVL=1.0 V and CVH=4.5 V. In addition, the pixels adjacent to the risk boundary are set to $\alpha=\beta=0.1$, and the pixels separated by one pixel from the risk boundary are set to $\alpha=\beta=0.05$.

First, the application voltages to the six pixels are replaced with 5.0 V, 4.5 V, 4.0 V, 2.0 V, 1.0 V, and 0.0 V by the voltage replacing unit 32. Subsequently, the potential difference correcting unit 33 calculates a correction value with respect to the replaced application voltage. The correction value for the pixels adjacent to the risk boundary is 2.0 V×0.1=0.2 V, and the correction value for the pixels separated by one pixel from the risk boundary is 2.0 V×0.05=0.1 V. The application voltages of each pixel are corrected to 5.0 V, 4.4 V, 3.8 V, 2.2 V, 1.1 V, and 0.0 V by addition of the correction value for the dark pixel and subtraction of the correction value for the bright pixel. According to the example, it is possible to further reduce a horizontal electric field, compared with a case where only one pixel adjacent to the risk boundary is corrected.

5-2. Modification Example 2

The number of voltage regions which are separated in the V-T characteristics is not limited to three. The number of voltage regions may be two and may be four or more. In addition, a method of separating the voltage regions may be any method as long as the voltage regions are separated according to a slope of the V-T characteristics. As an example, the voltage region can be separated into a region where the slope (differentiation coefficient) of the V-T characteristics is greater than a predetermined threshold and a region where the slope is smaller than the predetermined threshold.

In a case where the V-T characteristics are separated into four voltage regions, and in a case where two or more voltage regions are interposed between the voltage region contained in the dark pixel and the voltage region contained in the bright pixel, replacement of a voltage value may be repeated until the dark pixel and the bright pixel are contained in the same voltage region, and the number of replacements may be limited.

Figure 26:
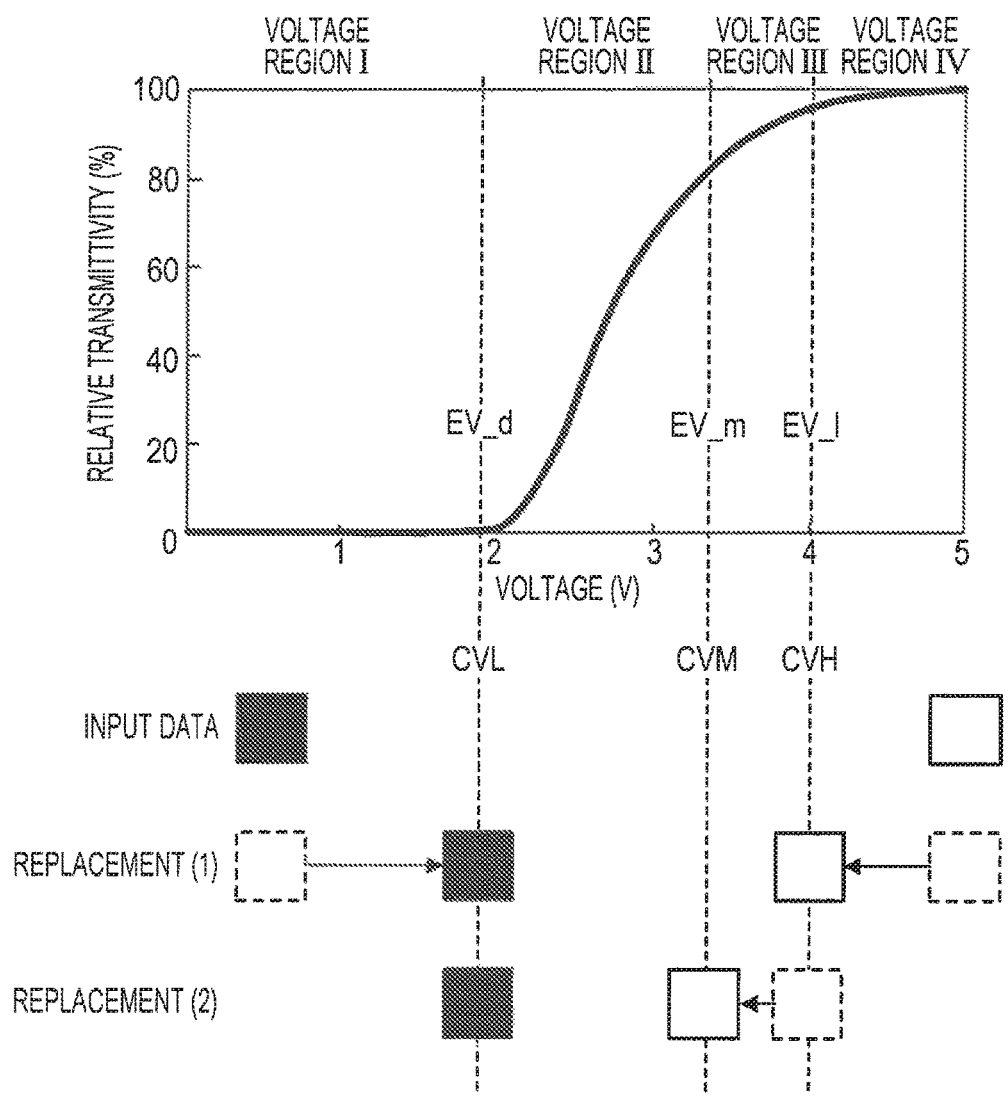
FIG. 26 is a diagram exemplifying replacement of a voltage value according to a modification example 2.

FIG. 26 is a diagram exemplifying replacement of a voltage value according to a modification example 2. In the example, the V-T characteristics are separated into four regions of voltage regions I to IV, the dark pixel is contained in the voltage region I, and the bright pixel is contained in the voltage region IV, respectively. If the slopes of V-T characteristics in the voltage regions I to IV are respectively referred to as a1 to a4, a2>a3>a4>a1 is satisfied. Voltage values of boundaries between the voltage regions are EV_d, EV_m, and EV_l in an ascending order, and the replaced voltage values are CVL=EV_d, CVM=EV_m, and CVH=EV_l in an ascending order First, the application voltage to the dark pixel is replaced with CVL, and the application voltage to the bright pixel is replaced with CVH. In this step, the dark pixel is contained in the voltage region II, the bright pixel is contained in the voltage region III, that is, both pixels are contained the voltage regions different from each other. Hence, furthermore, the application voltage to the bright pixel is replaced with CVM. Thus, both pixels are contained in the voltage region II in common. The replaced voltage value is corrected by using the correction coefficient corresponding to the voltage region II.

In the example, for example, the replacement of the voltage value for each of the dark pixel. and the bright pixel may be limited to only once. In this case, the replacement ends in a step in which the application voltage to the dark pixel is replaced with CVL and the application voltage to the bright pixel is replaced with CVH, respectively. The voltage values are corrected by using the correction coefficient corresponding to the voltage region I for the dark pixel and the correction coefficient corresponding to the voltage region III for the bright pixel, respectively.

5-3. Modification Example 3

The correction which is performed by the potential difference correcting unit 33 may be omitted, Even in this case, the potential difference between the bright pixel and the dark pixel is reduced by the replacement of the voltage value which performed by the voltage replacing unit 32, and thus, a horizontal electric field is reduced as compared with a case where no processing is performed.

5-4. Modification Example 4

The correction coefficients which are used for the potential difference correcting unit 33 are not limited to different coefficients in each voltage region. A common correction coefficient may be used for all voltage regions. In addition, the correction coefficients of the dark pixel and the bright pixel are not limited to coefficients which are individually set respectively. A common correction coefficient may be used for the dark pixel and the bright pixel.

5-5. Modification Example 5

In the second embodiment, the weight coefficient w may not be applied to the correction coefficient. That is, calculation of the correction coefficients which is performed by using Expression (7) and Expression (9) may be omitted.

5-6. Modification Example 6 in the second embodiment, the range in which the weight coefficient w changes from 0 to 1 is not limited to the exemplified thing. For example, in a case of EV_d=2.0 V, the weight coefficient w1 may continuously changes from 0 to 1 in a range of $2.0 \text{ V} \leq \text{Vlt\_in} \leq 3.0 \text{ V}$. Alternatively, in this case, the weight coefficient w1 may change from 0 to 1 in a range which exceeds the boundary between the voltage regions such that a range of $1.5 \text{ V} \leq \text{Vlt\_in} \leq 2.5 \text{ V}$ is satisfied.

5-7. Other Modification Examples

In the embodiments, detection of the risk boundary or the correction processing is performed for data indicating an application voltage, but the processing may be performed for data indicating a gradation value.

The liquid crystal 105 is not limited to a VA liquid crystal. A liquid crystal other than the VA liquid crystal, such as a twisted nematic (TN) liquid crystal may be used. In addition, the liquid crystal 105 may be a liquid crystal of a normally white mode.

The parameters (for example, the number of gradations, frame frequency, the number of pixels, and the like) and a polarity or a level of the signal which are described in the embodiments are simply exemplifications, and the invention is not limited to this.

The entire disclosure of Japanese Application No. 2016-090648, field Apr. 28, 2016 is expressly incorporated by reference herein.

What is claimed is:

1. A video processing circuit comprising:
   a processor or circuit configured to:
   detect a set of a first pixel and a second pixel that is adjacent to the first pixel from a pixel group that is arranged in a first direction and a second direction, the first and second pixels being a set of pixels in which a difference between application voltages to the first pixel and the second pixel is greater than or equal to a threshold;
   acquire information specifying a plurality of regions of voltage-brightness characteristics of the pixel group, the plurality of regions being divided from each other based on a slope of the voltage-brightness characteristics of a respective region, the plurality of regions of the voltage-brightness characteristics of the pixel group being separated into three or more regions;
   in response to the application voltage to the first pixel contained in a first voltage region being different from the application voltage to the second pixel contained in a second voltage region where the second voltage region is different from the first voltage region, replace the application voltage to the first pixel with a voltage that is in a voltage region other than the first voltage region and has voltage-brightness characteristics close to the second voltage region; and
   in response to a third voltage region being interposed between the first voltage region and the second voltage region, replace the application voltage to the first pixel and the application voltage to the second pixel with a voltage in the third voltage region.

2. The video processing circuit according to claim 1, wherein the processor or circuit is further configured to:
   replace a pixel in the set of pixels, which is contained in a region where a slope of the voltage-brightness characteristics is smoother, with the first pixel.

3. The video processing circuit according to claim 1, wherein the processor or circuit is further configured to:
   determine the replaced application voltage to the first pixel based on the application voltage to the second pixel.

4. The video processing circuit according to claim 1, wherein the processor or circuit is further configured to:
   correct at least one of the application voltages to the first pixel and the second pixel such that a difference between the application voltages to the first pixel and the second pixel is reduced.

5. The video processing circuit according to claim 4, wherein the processor or circuit is further configured to:
   multiply the application voltage to the first pixel by a correction coefficient, and
   determine the correction coefficient with respect to each of the plurality of regions.

6. The video processing circuit according to claim 5, wherein the steeper the slope of the voltage-brightness characteristics in the plurality of regions is, the smaller a value of the correction coefficient is.

7. The video processing circuit according to claim 5, wherein the processor or circuit is further configured to:
   correct the application voltage to the first pixel based on the correction coefficient whose value is determined in accordance with the application voltage to the second pixel.

8. An electro-optical device comprising:
   a display that includes a pixel group that are disposed in a first direction and a second direction; and
   a processor or circuit configured to:
   detect a set of a first pixel and a second pixel that is adjacent to the first pixel from the pixel group, the first and second pixels being a set of pixels in which a difference between application voltages to the first pixel and the second pixel is greater than or equal to a threshold;
   acquire information specifying a plurality of regions of voltage-brightness characteristics of the pixel group, the plurality of regions being divided from each other based on a slope of the voltage-brightness characteristics of a respective region, the plurality of regions of the voltage-brightness characteristics of the pixel group being separated into three or more regions;
   in response to the application voltage to the first pixel contained in a first voltage region being different from the application voltage to the second pixel contained in a second voltage region where the second voltage region is different from the first voltage region, replace the application voltage to the first pixel with a voltage that is in a voltage region other than the first voltage region and has voltage-brightness characteristics close to the second voltage region; and in response to a third voltage region being interposed between the first voltage region and the second voltage region, replace the application voltage to the first pixel and the application voltage to the second pixel with a voltage in the third voltage region.

9. An electronic apparatus comprising:
electro-optical device according to claim 8.

10. A video processing method comprising:
detecting a set of a first pixel and a second pixel that is adjacent to the first pixel from a pixel group that is arranged in a first direction and a second direction, the first and second pixels being a set of pixels in which a difference between application voltages to the first pixel and the second pixel is greater than or equal to a threshold;

acquiring information specifying a plurality of regions of voltage-brightness characteristics of the pixel group, the plurality of regions being divided from each other based on a slope of the voltage-brightness characteristics of a respective region, the plurality of regions of the voltage-brightness characteristics of the pixel group being separated into three or more regions;

in response to the application voltage to the first pixel contained in a first voltage region being different from the application voltage to the second pixel contained in a second voltage region where the second voltage region is different from the first voltage region, replacing the application voltage to the first pixel with a voltage that is in a voltage region other than the first voltage region and has voltage-brightness characteristics close to the second voltage region; and in response to a third voltage region being interposed between the first voltage region and the second voltage region, replacing the application voltage to the first pixel and the application voltage to the second pixel with a voltage in the third voltage region.

* * * * *